(12) United States Patent
Volk

(10) Patent No.: US 7,740,354 B2
(45) Date of Patent: *Jun. 22, 2010

(54) MULTI-LAYERED GRADIENT INDEX PROGRESSIVE LENS

(76) Inventor: Donald A. Volk, 3872 Owena St., Honolulu, HI (US) 96815

( * ) Notice: Subject to any disclaimer, the term of this patent is extended or adjusted under 35 U.S.C. 154(b) by 38 days.

This patent is subject to a terminal disclaimer.

(21) Appl. No.: 11/977,353

(22) Filed: Oct. 24, 2007

(65) Prior Publication Data
US 2008/0123048 A1 May 29, 2008

Related U.S. Application Data

(60) Provisional application No. 60/854,469, filed on Oct. 25, 2006.

(51) Int. Cl.
*G02C 7/06* (2006.01)
*G02B 3/00* (2006.01)

(52) U.S. Cl. .................. 351/171; 351/161; 351/168; 351/172; 359/652

(58) Field of Classification Search ......... 359/652–654; 351/159, 160 R, 161, 168, 169, 171, 172
See application file for complete search history.

(56) References Cited

U.S. PATENT DOCUMENTS

| 3,485,556 A | 12/1969 | Naujokas |
| 3,486,808 A | 12/1969 | Hamblen |
| 3,542,535 A | 11/1970 | Hensler et al. |
| 3,563,057 A | 2/1971 | Rosenbauer |
| 3,729,253 A | 4/1973 | Moore et al. |
| 3,904,281 A | 9/1975 | Jampolsky |
| 4,022,855 A | 5/1977 | Hamblen |
| 4,070,105 A | 1/1978 | Marzouk |
| 4,073,579 A | 2/1978 | Deeg et al. |
| 4,146,306 A | 3/1979 | Wallach |
| 4,210,391 A | 7/1980 | Cohen |
| 4,340,283 A | 7/1982 | Cohen |
| 4,422,733 A | 12/1983 | Kikuchi et al. |
| 4,645,523 A | 2/1987 | Howard et al. |
| 4,666,236 A | 5/1987 | Mikami et al. |
| 4,810,070 A | 3/1989 | Suda et al. |

(Continued)

FOREIGN PATENT DOCUMENTS

WO     WO 97/10527     3/1997

(Continued)

OTHER PUBLICATIONS

David Joel Fischer, Gradient-Index Ophthalmic Lens Design and Polymer Material Studies, Ph.D Thesis University of Rochester, 2002.

(Continued)

*Primary Examiner*—Darryl J Collins

(57) ABSTRACT

The present invention relates to a gradient index progressive addition spectacle lens that provides improved optical performance and a wide visual field. The lens comprises a plurality of axially layered and bonded lens sections of continuous curvature at least one of which has a refractive index gradient oriented transverse to a meridian of the lens that functions as a progressive intermediate vision zone between viewing portions of different refractive index that provide the refractive powers for corresponding vision portions of the lens. The other layer(s) of the lens incorporates a generally constant or similarly changing refractive index.

25 Claims, 15 Drawing Sheets

U.S. PATENT DOCUMENTS

| | | | |
|---|---|---|---|
| 4,824,227 A | 4/1989 | Goldenberg et al. |
| 4,898,461 A | 2/1990 | Portney |
| 4,944,584 A | 7/1990 | Maeda et al. |
| 4,950,057 A | 8/1990 | Shirayanagi |
| 5,042,936 A | 8/1991 | Guilino et al. |
| 5,061,058 A | 10/1991 | Guilino et al. |
| 5,080,472 A | 1/1992 | Gupta |
| 5,095,079 A | 3/1992 | Yean et al. |
| 5,100,589 A | 3/1992 | Ticknor |
| 5,148,205 A | 9/1992 | Guilino et al. |
| 5,229,797 A | 7/1993 | Futhey et al. |
| 5,258,144 A | 11/1993 | Yean et al. |
| 5,386,312 A | 1/1995 | Spencer |
| 5,541,774 A | 7/1996 | Blankenbecler |
| 5,617,252 A | 4/1997 | Manhart et al. |
| 5,779,751 A | 7/1998 | Wong |
| 5,847,803 A | 12/1998 | Gupta et al. |
| 5,861,934 A | 1/1999 | Blum et al. |
| 5,907,386 A | 5/1999 | Gupta et al. |
| 5,917,105 A | 6/1999 | Xu et al. |
| 5,982,543 A | 11/1999 | Fiala |
| 5,982,545 A | 11/1999 | Su |
| 5,998,096 A | 12/1999 | Umemoto et al. |
| 6,027,672 A | 2/2000 | Weitzel et al. |
| 6,081,632 A | 6/2000 | Yoshimura et al. |
| 6,089,711 A | 7/2000 | Blankenbecler et al. |
| 6,220,705 B1 | 4/2001 | Francois et al. |
| 6,240,226 B1 | 5/2001 | Presby et al. |
| 6,319,433 B1 | 11/2001 | Kohan |
| 6,709,107 B2 | 3/2004 | Jiang et al. |
| 6,712,466 B2 | 3/2004 | Dreher |
| 6,813,082 B2 | 11/2004 | Bruns |
| 6,836,371 B2 | 12/2004 | Lai et al. |
| 6,840,619 B2 | 1/2005 | Dreher |
| 6,934,088 B2 | 8/2005 | Lai et al. |
| 6,942,339 B2 | 9/2005 | Dreher |
| 6,951,391 B2 | 10/2005 | Morris et al. |
| 6,976,641 B2 | 12/2005 | Lai et al. |
| 6,989,938 B2 | 1/2006 | Bruns |
| 7,002,754 B2 | 2/2006 | Baer et al. |
| 7,025,456 B2 | 4/2006 | Morris et al. |
| 7,093,938 B2 | 8/2006 | Morris et al. |
| 7,156,516 B2 | 1/2007 | Morris et al. |
| 7,217,375 B2 | 5/2007 | Lai |
| 7,232,218 B2 | 6/2007 | Morris et al. |
| 7,249,847 B2 | 7/2007 | Dreher |
| 7,293,871 B2 | 11/2007 | Dreher et al. |
| 7,371,804 B2 | 5/2008 | Jethmalani et al. |
| 7,377,640 B2 | 5/2008 | Piers et al. |
| 7,420,743 B2 | 9/2008 | Lai et al. |
| 7,455,404 B2 | 11/2008 | Bandhauer et al. |
| 7,473,378 B2 | 1/2009 | Li et al. |
| 2002/0080464 A1 | 6/2002 | Bruns |
| 2004/0051846 A1 | 3/2004 | Blum |
| 2008/0123049 A1 | 5/2008 | Volk |

FOREIGN PATENT DOCUMENTS

| | | |
|---|---|---|
| WO | WO 99/13361 | 3/1999 |
| WO | WO 2006/036762 | 4/2006 |
| WO | PCT/US2007/022574 | 5/2008 |

OTHER PUBLICATIONS

Blaine R. Copenheaver, International Search Report and Written Opinion for application PCT/US2007/022574, Apr. 30, 2008, 8 pages.

Lee W. Young, International Search Report and Written Opinion for application PCT/US2007/022615, May 13, 2008, 7 pages.

Darryl J. Collins, Official Action, Notification date of Sep. 3, 2009, U.S. Appl. No. 11/977,362, Titled: Multi-Layered Multifocal Lens with Blended Refractive Index, Filed: Oct. 24, 2007, Inventor: Donald A. Volk, 5 pages.

| Lens | R1-convex Anterior | R2-internal Interface | R3-concave Posterior | Center T CT mm | Edge T ET mm | Sphere CREN | Conic CC constant | Best fit sphere CREN |
|---|---|---|---|---|---|---|---|---|
| #1 | 65.9163 | -200 | -75.3848 | 3.38 | 2.78 | 18.436 | -.018 (a) | 18.426 |
| #2 | 78.3036 | -400 | -92.7272 | 3.35 | 2.74 | 18.555 | -.243 (a) | 18.482 |
| #3 | 86.4914 | -800 | -104.8111 | 3.34 | 2.72 | 18.603 | -.485 (a) | 18.496 |
| #4 | 96.6458 | plano | -120.5435 | 3.33 | 2.71 | 18.643 | -.918 (a) | 18.499 |
| #5 | 109.5707 | 800 | -141.8702 | 3.32 | 2.70 | 18.675 | -1.733 (a) | 18.491 |
| #6 | 126.5772 | 400 | -172.4195 | 3.32 | 2.70 | 18.700 | -3.338 (a) | 18.474 |
| #7 | 184.1299 | 200 | -303.349 | 3.32 | 2.70 | 18.727 | -14.879 (a) | 18.419 |

Approximate maximum RID of 1st section →

Approximate maximum RID of lens →

| Refractive Index Difference (RID) | 1 | 1.5 | 2.0 | 2.5 | 3.0 | 3.5 |
|---|---|---|---|---|---|---|
| 0 | 46.69 – 50.01 | — | — | — | — | — |
| .1 | 30.92 – 32.83 | 45.84 – 49.12 | — | — | — | — |
|  | 23.31 – 24.64 | 34.70 – 36.93 | 45.85 – 49.46 | — | — | — |
|  | 18.36 – 19.36 | 27.39 – 29.03 | 36.28 – 38.86 | — | — | — |
|  | 15.33 – 16.14 | 22.89 – 24.20 | 30.37 – 32.38 | — | — | — |
|  | 12.91 – 13.58 | 19.30 – 20.37 | 25.63 – 27.23 | — | — | — |
|  | 11.31 – 11.88 | 16.91 – 17.82 | 21.85 – 23.82 | — | — | — |
|  | 9.87 – 10.36 | 14.77 – 15.55 | 19.63 – 20.77 | — | 45.02 – 48.59 | 44.17 – 47.70 |
| .2 | 8.89 – 9.33 | 13.30 – 13.99 | 17.69 – 18.69 | 45.01 – 48.57 | 38.07 – 40.89 | 38.85 – 41.76 |
|  | 7.93 – 8.32 | 11.87 – 12.48 | 15.79 – 16.66 | 37.75 – 40.49 | 33.45 – 35.78 | 34.00 – 36.42 |
|  | 7.27 – 7.62 | 10.89 – 11.44 | 14.49 – 15.27 | 31.89 – 34.06 | 29.25 – 31.20 | 30.68 – 32.77 |
|  | 6.59 – 6.90 | 9.86 – 10.36 | 13.12 – 13.82 | 27.98 – 29.80 | 23.56 – 25.03 | 27.41 – 29.22 |
|  |  |  |  | 24.46 – 25.98 | 21.63 – 22.94 | 25.17 – 26.78 |
|  |  |  |  | 22.05 – 23.38 | 19.60 – 20.76 | 22.82 – 24.24 |
|  |  |  |  | 19.69 – 20.84 | 18.22 – 19.27 | 21.21 – 22.5 |
|  |  |  |  | 18.07 – 19.10 |  |  |
|  |  |  |  | 16.37 – 17.29 |  |  |
| .3 | 6.12 – 6.41 | 9.16 – 9.62 | 12.19 – 12.83 | 15.21 – 16.05 | 16.68 – 17.63 | 19.42 – 20.58 |
|  | 5.60 – 5.86 | 8.38 – 8.80 | 11.16 – 11.74 | 13.93 – 14.68 | 15.65 – 16.53 | 18.22 – 19.29 |
|  | 5.25 – 5.50 | 7.86 – 8.25 | 10.47 – 11.00 | 13.06 – 13.76 | 14.99 – 15.81 | 17.46 – 18.46 |
|  | 5.02 – 5.26* | 7.53 – 7.89 | 10.02 – 10.52 | 12.51 – 13.16 | 14.22 – 14.98 | 16.57 – 17.49 |
|  | 4.76 – 4.98 | 7.14 – 7.48 | 9.50 – 9.97 | 11.86 – 12.47 | 13.68 – 14.40 | 15.94 – 16.81 |
| .4 | 4.58 – 4.79 | 6.86 – 7.19 | 9.14 – 9.58 | 11.41 – 11.99 | 13.07 – 13.74 | 15.23 – 16.04 |
|  | 4.37 – 4.57 | 6.55 – 6.86 | 8.73 – 9.15 | 10.90 – 11.44 | 12.62 – 13.26 | 14.71 – 15.48 |
|  | 4.22 – 4.41 | 6.33 – 6.62 | 8.43 – 8.83 | 10.52 – 11.04 | 12.12 – 12.73 | 14.13 – 14.86 |
|  | 4.05 – 4.24 | 6.07 – 6.36 | 8.09 – 8.48 | 10.11 – 10.60 | 11.74 – 12.32 | 13.69 – 14.39 |
|  | 3.93 – 4.10 | 5.88 – 6.15 | 7.84 – 8.20 | 9.79 – 10.26 | 11.33 – 11.89 | 13.21 – 13.88 |
| .5 | 3.79 – 3.96 | 5.68 – 5.94 | 7.56 – 7.91 | 9.45 – 9.90 | 11.00 – 11.54 | 12.83 – 13.47 |
|  | 3.68 – 3.84 | 5.51 – 5.76 | 7.34 – 7.68 | 9.17 – 9.61 | 10.56 – 11.17 | 12.43 – 13.05 |
|  | 3.56 – 3.72 | 5.34 – 5.58 | 7.11 – 7.44 | 8.89 – 9.31 | 10.37 – 10.87 | 12.10 – 12.69 |
|  | 3.47 – 3.62 | 5.20 – 5.43 | 6.92 – 7.24 | 8.65 – 9.05 | 10.08 – 10.56 | 11.76 – 12.33 |
|  | 3.37 – 3.52 | 4.94 – 5.28 | 6.73 – 7.03 | 8.41 – 8.80 | 9.83 – 10.30 | 11.46 – 12.02 |
|  | 3.28 – 3.43 | 4.92 – 5.14 | 6.56 – 6.86 | 8.20 – 8.57 | 9.58 – 10.03 | 11.17 – 11.71 |
| .6 | 3.20 – 3.34 | 4.80 – 5.01 | 6.39 – 6.68 | 7.99 – 8.36 | 9.36 – 9.80 | 10.91 – 11.44 |
|  | 3.13 – 3.26 | 4.69 – 4.90 | 6.24 – 6.52 | 7.80 – 8.16 | 9.14 – 9.57 | 10.66 – 11.17 |
|  | 3.05 – 3.19 | 4.58 – 4.78 | 6.10 – 6.37 | 7.62 – 7.97 |  |  |

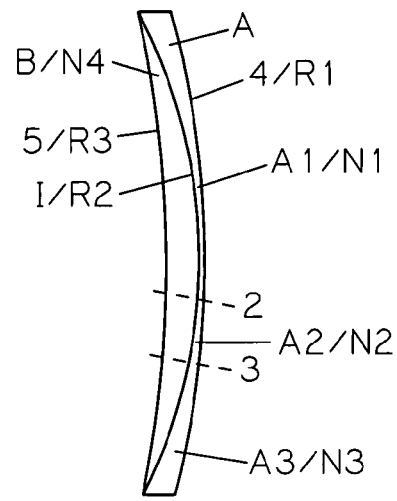
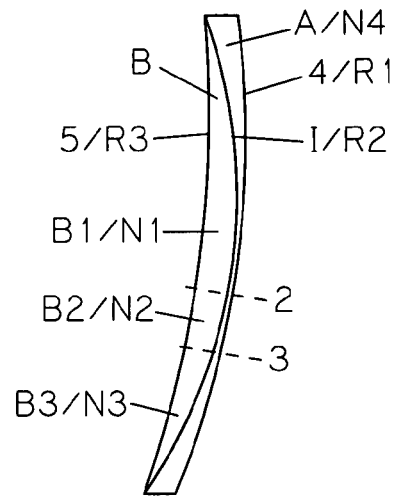
FIG. 8    FIG. 9
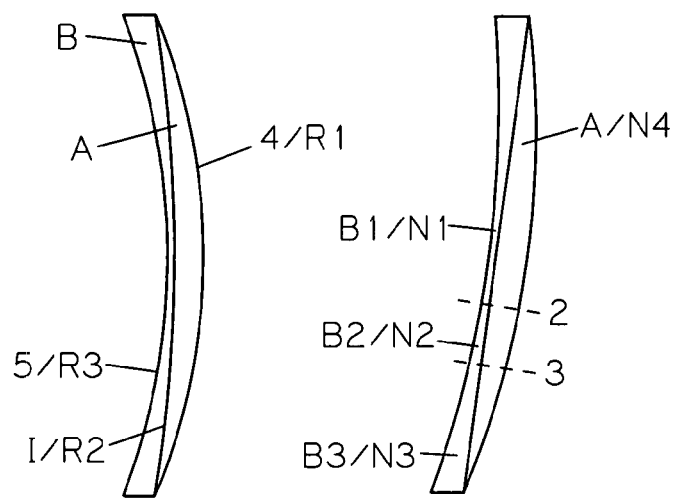
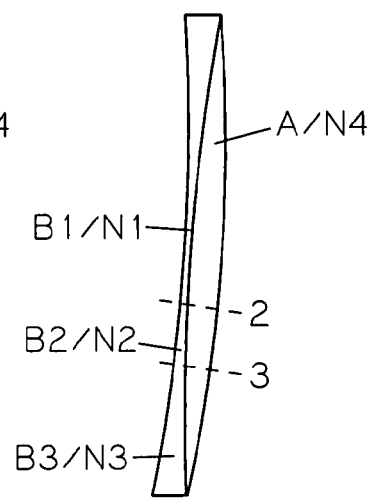
FIG. 10a    FIG. 10b    FIG. 10c

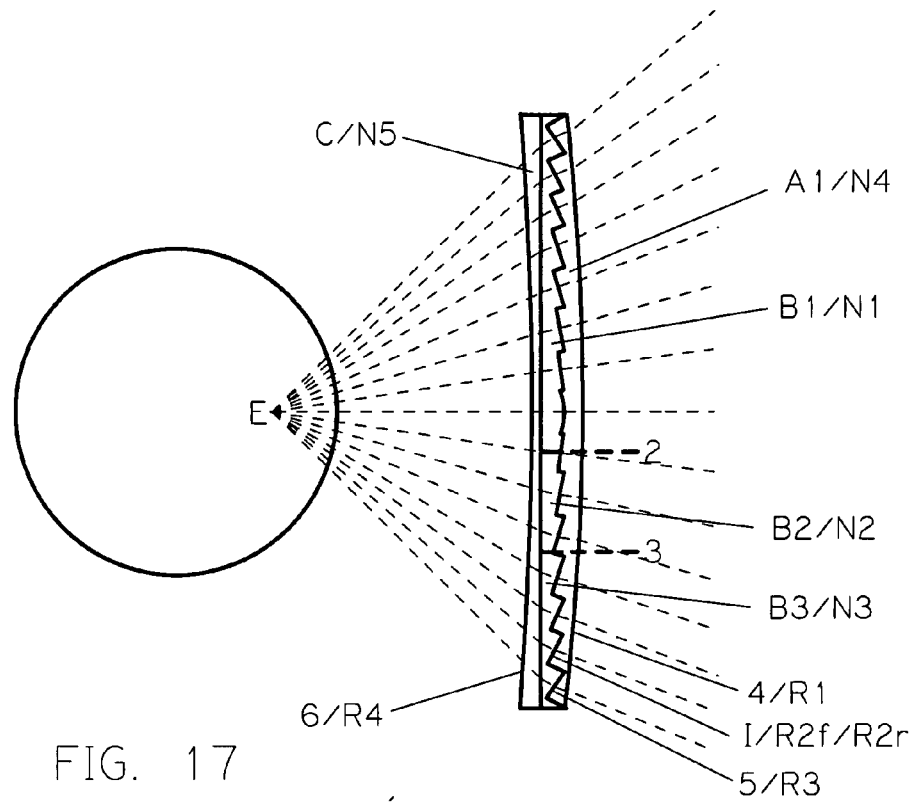
FIG. 17
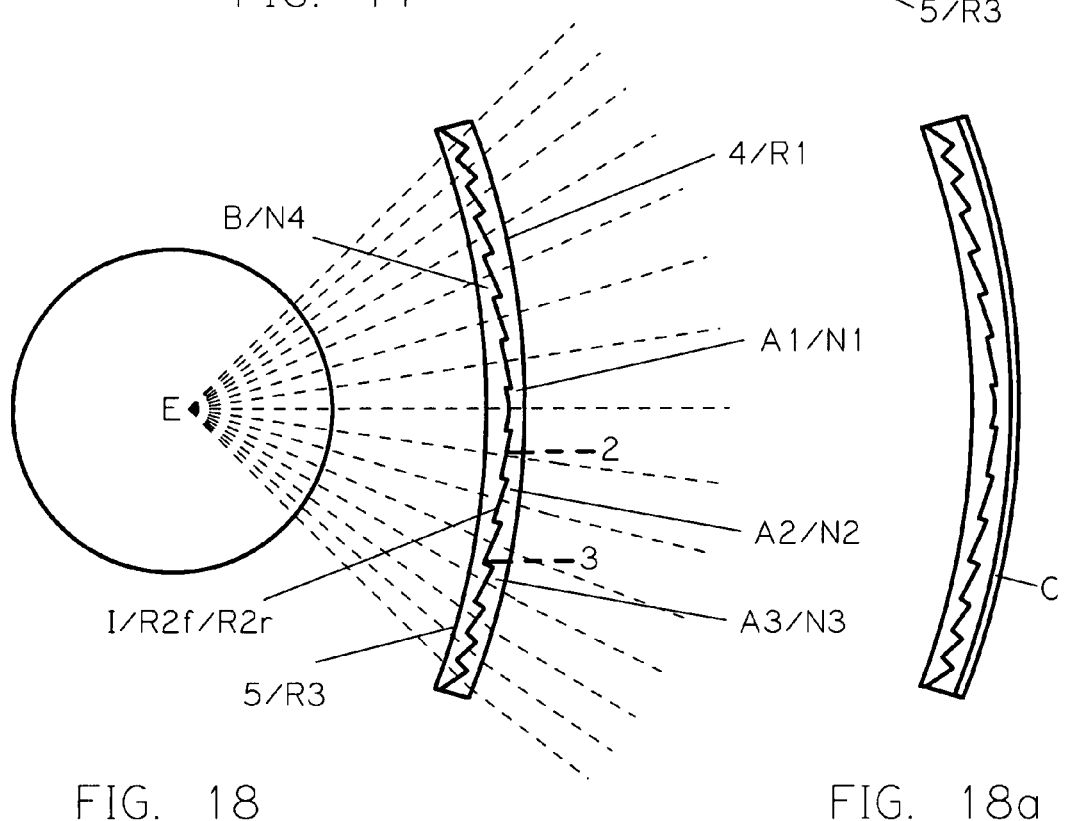
FIG. 18
FIG. 18a

MULTI-LAYERED GRADIENT INDEX PROGRESSIVE LENS

This application claims the benefit of U.S. Provisional Application Ser. No. 60/854,469 filed Oct. 25, 2006.

The present invention relates to a gradient index progressive addition spectacle lens that provides improved optical performance and a wide visual field. The lens comprises a plurality of axially layered and bonded lens sections of continuous curvature at least one of which has a refractive index gradient oriented transverse to a meridian of the lens that functions as a progressive intermediate vision zone between viewing portions of different refractive index that provide the refractive powers for corresponding vision portions of the lens. The other layer(s) of the lens incorporates a generally constant or similarly changing refractive index.

BACKGROUND

Progressive addition spectacle lenses are visual aids used in the management of presbyopia, the condition wherein the accommodative function of the eye is partially or fully lost. The Vision Council of America defines a progressive lens as a lens designed to provide correction for more than one viewing distance in which the power changes continuously rather than discretely. The power change of a progressive lens may be derived by modifying the surface curvature of a lens or the refractive index of the optical material comprising the lens, or both. A number of gradient index lens types have been proposed for use as progressive addition lenses. These lenses provide a change or gradient of refractive power over what may be termed a progressive intermediate vision or transition zone of the lens through a corresponding change in refractive index of the optical media comprising the lens, theoretically providing the advantage of reducing or avoiding the astigmatism associated with non-rotationally symmetric aspheric surface contours common to conventional progressive addition lenses. Due to problems associated with these designs, including issues and difficulties relating to manufacturing, there has been no commercialization of gradient index progressive power lenses. In order to provide adequate power for both distance and near vision functioning, a significant amount of refractive index change in the optical material is required. Ion exchange methods, proposed by some to achieve a refractive index change, may tend to offer both an undesirable gradient index profile and less than the needed power change for a progressive addition spectacle lens. Lenses produced by diffusion methods likewise have failed to provide adequate add power or realize commercial success.

U.S. Pat. No. 3,485,556 to Naujokas describes a multifocal plastic ophthalmic lens wherein there is provided a major lens portion of one index of refraction and a minor lens portion of a different index of refraction with a uniform index gradient therebetween. The plastic materials are produced by a process in which an interface is established between monomeric liquids and diffused over time in an isothermally controlled environment and then polymerized.

This lens at first appears to be capable of providing the stated distance and near vision properties. A ray tracing of the lens in accordance with the parameters set forth in the patent shows that only when a significantly high plus power configuration is utilized can an add power of even 1 diopter be achieved. Using the refractive indices of 1.5 and 1.6 identified in the patent a calculated plus power of 4.714 diopters is needed in the distance vision portion to achieve the only slightly greater power of 5.714 diopters in the near vision portion, thus the lens is useful only to those needing high plus power correction for distance vision. Furthermore, if a prescription incorporating cylinder power is produced on either the front or back surface, the cylinder power will vary and cause aberrations as a result of the changing refractive index.

U.S. Pat. No. 5,042,936 to Guilino et al. describes a progressive ophthalmic lens comprising a distance portion, the refractive power of which being designed for distance vision, a reading portion, the refractive power of which being designed for near vision, and an intermediate portion, in which the refractive power along the main line of vision at least partially increases continuously from the refractive power of the distance portion to the reading portion. A refractive index of the lens material varies along the main line of vision at least in the intermediate portion so as to at least partially contribute to the increase in refractive power and correction of aberrations.

According to the specification, each of two progressive ophthalmic lenses in front of the left or right eye is provided with a main point of vision (distance reference point) Bf for distance vision and a main point of vision (near reference point) Bn for near vision. Furthermore as stated, the distances y'BF and y'BN of the distance or near reference point from the apex of the lens have the following values:
Y'BF=4.0 mm, and y'BN=−14 mm In other words, the main point for distance vision is 4 mm above the apex of the lens and the main point for near vision is 14 mm below the apex of the lens. Also stated in the specification, the refractive index function is a) solely a function of the coordinate y' so that by varying the refractive index, the increase in refractive power is produced only along the main meridian, or b) a function of the coordinate y' and x' so that not only the increase in refractive power along the main meridian, but also the correction of imaging errors on the main meridian and borne by the varying refractive index. Supported by the patent's drawings 4a and 4b respectively the index of refraction is shown in 4a to decrease below the main point for distance vision 4 mm above the apex of the lens to the main point for near vision at the −14 mm location, and well beyond. In fact the refractive index changes most dramatically below the −14 mm mark to the −20 mm mark (1.57 to 1.51[0.06 index units] over 6 mm) and comparatively least above the −14 mm mark to the 4 mm point for distance vision (1.57 to 1.604 [0.034 index units] over 18 mm). What this means is that the so-called reading portion has the most increase in refractive power change, and therefore fits more the definition of the intermediate portion, and the intermediate portion, from 4 mm to −14 mm, has comparatively the least increase in refractive power change, and therefore fits more the definition of the reading portion. A lens with altogether different refractive properties is needed to provide good optical qualities for a progressive ophthalmic lens.

U.S. Pat. No. 5,148,205 to Guilino et al. describes an ophthalmic lens having a front and an eye-facing boundary surface and a varying refractive index, which contributes to the correction of aberrations. The ophthalmic lens is distinguished by having at least one system of surfaces a given level (n(x,y,z)=const.) with a constant refractive index, which are spaced the same distance at all points in the direction of their surface normals (parallel surfaces), and which, respectively their extension, intersect the axis connecting the lens apexes of the front surface and the eye-facing surface. This patent describes a lens with a refractive index variation which depends on both the coordinate z lying in the direction of connecting axis of the apex of the lens and the coordinates x,y being perpendicular to the connecting axis, and therefore permits correcting aberrations and minimizing the critical lens thickness in a very simple manner. According to the specification, the gradients may be utilized for generating an astigmatic and/or progressive refractive power, with the design of the surface not or only partially contributing to the astigmatic and/or progressive refractive power. The bulk of the patent is directed to the use of what may be termed axial or modified axial refractive index gradients for the correction of aberrations and minimizing critical lens thickness. Only incidentally is there mention of the use of such refractive index gradients for a progressive addition spectacle lens. Such a design would appear to be very similar to that described in U.S. Pat. No. 5,042,936 to the same inventor filed less than one year earlier. Regardless whether the refractive index increases or decreases with increasing values of Z, such a progressive lens would suffer from similar or identical problems as the U.S. Pat. No. 5,042,936 lens referenced and described above.

U.S. Pat. No. 5,861,934 to Blum et al. describes a refractive index gradient lens comprising a composite of at least three different and separately applied layers, each layer having a different refractive index which allow for a progressive multifocal lens having a wide and natural progression of vision when looking from far to near. A transition zone disposed between a base and an outer layer includes a distinct and separately applied transition layer or layers having an effective refractive index which is intermediate between the refractive indices of the base and outer layers, and preferably approximates the geometric mean of the refractive indices of the base and outer layers. This transition zone may include multiple transition layers, with each transition layer having a different and distinct refractive index. In this lens invention the refractive indices of the base, outer and transition layer(s) are each constant throughout their respective layers. Included within the lens design is a region of varying thickness which defines a progressive multifocal zone. The technique of employing a transition zone having an intermediate refractive index is used in order to render the progressive multifocal area as invisible as possible. As stated in the patent, by way of example only, if the preform has a refractive index of about 1.50 and the outer layer has a refractive index of about 1.70, the refractive indices of three transition layers in a transition zone may be about 1.54, 1.60 and 1.66 as the layers progress from the preform to the outer layer. In this invention the gradient index does not contribute to the progressive power as in the previously mentioned prior art patents; rather, within the lens is a region of varying thickness which defines a progressive multifocal zone.

U.S. Pat. No. 6,942,339 to Dreher describes a multifocal or progressive lens constructed with a layer of variable index material, such as epoxy, sandwiched in between two lens blanks. The inner epoxy coating aberrator has vision zones configured to correct aberrations of the patient's eye and higher order aberrations. The variable index coating that comprises the inner layer of this lens does not provide the progressive add power of the lens, rather as stated in the patent it corrects for aberrations of the patient's eye. The lens has many of the limitations typical of aspheric progressive lenses.

SUMMARY

Based on the foregoing, there is found to be a need to provide a gradient index progressive spectacle lens that avoids the problems associated with the prior art lenses and which in particular has improved optical attributes. The benefits are derived from a multi-layered lens incorporating a refractive index gradient that provides the required power variation for visualization over a range of viewing distances. It is therefore a main object of the present invention to provide a multi-layered progressive lens that comprises at least one layer incorporating a refractive index gradient that provides an area of progressive intermediate vision.

It is another object of the invention to provide a gradient index progressive lens wherein the refractive index gradient is oriented transverse to a meridian of the lens, generally from lens top to bottom, changing gradually and continuously following the progression of a ½ sine wave or sine wave like curve.

It is another object of the invention to provide a gradient index progressive lens that comprises two layers, one of which incorporates the refractive index gradient and the other which provides a surface on which to incorporate a patient's prescription.

It is another object of the invention to provide a gradient index progressive lens that comprises two layers, each layer incorporating a refractive index gradient profile and power sign opposite the other, so as to effectively increase the refractive index and power difference between far and near vision portions of the lens.

It is another object of the invention to provide a gradient index progressive lens that comprises three layers, two adjacent layers incorporating a refractive index gradient profile and power sign opposite the other, and the third having a surface on which to incorporate a patient's prescription.

It is another object of the invention to provide a gradient index progressive lens incorporating a refractive index gradient that comprises two layers, each layer having a refractive index gradient profile and power sign opposite the other, wherein the refractive index gradient sections are either aligned or misaligned.

It is another object of the invention to provide a gradient index progressive lens incorporating a refractive index gradient that comprises three layers, two adjacent layers incorporating refractive index gradient profiles and power signs opposite the other, and the third having a surface on which to incorporate a patient's prescription, wherein the refractive index gradient sections are either aligned or misaligned.

It is another object of the invention to provide a gradient index progressive lens incorporating a refractive index gradient wherein all layers of the lens have surfaces with continuous curvature.

It is another object of the invention to provide a gradient index progressive lens incorporating a refractive index gradient wherein the lens is absent of a width-limited corridor of progressive intermediate vision, and wherein the progressive intermediate and near vision portions extend to lateral boundaries of the lens.

It is another object of the invention to provide a gradient index progressive lens that may be produced with a range of heights of the progressive intermediate vision portion, including progressive intermediate vision portions shorter than those typically provided in aspheric progressive lenses.

It is another object of the invention to provide a gradient index progressive lens incorporating a refractive index gradient that utilizes only spherical curvatures on the surfaces of the layers incorporating a refractive index gradient, and which provides excellent optical quality.

It is another object of the invention to provide a gradient index progressive lens incorporating a refractive index gradient that utilizes one or more rotationally symmetric aspheric surfaces to correct for astigmatic and other aberrations and to provide a wide range of optically corrected forms for spectacle lens application.

It is another object of the invention to provide a gradient index progressive lens incorporating a refractive index gradient that comprises numerous thin layers, each layer comprising a refractive index gradient profile and power sign opposite that of adjacent layers, wherein the thickness of the lens is comparable to that of a standard spectacle lens of similar add power.

It is another object of the invention to provide a gradient index progressive lens incorporating a refractive index gradient in the form of a doublet or triplet Fresnel lens.

It is another object of the invention to provide a gradient index progressive lens incorporating a refractive index gradient wherein the slopes of the non-optically functional steps of the Fresnel surface correspond to the angle of gaze of the patient and thereby do not obstruct light rays from an object especially in the peripheral visual field, thus increasing the efficiency of the lens.

It is another object of the invention to provide a gradient index progressive lens incorporating a refractive index gradient wherein the slopes of the non-optically functional steps of the Fresnel surface correspond to some degree to the angle of gaze of the patient and thereby partially limit the obstruction of light rays from an object especially in the peripheral visual field, thus increasing the efficiency of the lens.

It is another object of the invention to provide a gradient index progressive lens incorporating a refractive index gradient wherein the form of the lens is not flat, but rather curved about the eye, and wherein the slopes of the non-optically functional steps of the Fresnel surface correspond to the angle of gaze of the patient and thereby do not obstruct light rays from an object especially in the peripheral visual field, thus increasing the efficiency of the lens.

It is another object of the invention to provide a gradient index progressive lens incorporating a refractive index gradient wherein the form of the lens is not flat, but rather curved about the eye, and wherein the slopes of the non-optically functional steps of the Fresnel surface correspond to some degree to the angle of gaze of the patient and thereby partially limit the obstruction of light rays from an object especially in the peripheral visual field, thus increasing the efficiency of the lens.

These and other objects and advantages are accomplished by a progressive lens having continuous curvature and achieving increased power for progressive intermediate and near vision through a change of refractive index of the lens. The character and magnitude of the refractive index gradient(s) results in a lens that can provide high add power and improved vision with minimal astigmatism in a thin configuration.

The lens of the present invention employs one or more refractive index gradient layers comprising a multi-layered lens. The refractive index gradient profile corresponds to the regions of the lens that provide vision over the range of powers of the lens. The refractive index gradient is oriented transverse to a meridian of the lens, generally from lens top to bottom, with a substantially constant refractive index from one surface of the layer to the other. The refractive index gradient is defined by a rate of refractive index change ideally suited to provide smooth transitional power change through the progressive intermediate portion of the lens and generally follows the progression of a ½ sine wave or sine wave like curve from maximum to minimum extrema ($\pi/2$ to $3\pi/2$). Thus the rate of increase and decrease of refractive index change in the generally vertical orientation from the upper distance vision portion to the lower near vision portion of the lens provides a gradual increase and gradual decrease of power, while in a generally orthogonal direction along the gradient, there is substantially no change of refractive index. The terms vertical and orthogonal in reference to the gradient index profile are general terms and do not designate an exact degree of orientation. Because refractive index and therefore lens power are generally constant in the defined orthogonal direction along the gradient, vision through the progressive intermediate vision portion of the lens is not restricted in width or limited to a corridor of vision as is the case with conventional aspheric progressive lenses, but rather, like the distance vision portion above it and the near vision portion below it, the effectiveness of the progressive intermediate vision portion will extend fully along its width. The distance across the extent or span of the refractive index gradient defining the progressive intermediate lens portion should be great enough to provide meaningful optical performance, ranging from around 10 mm to 20 mm for example.

Though it might be assumed that an astigmatic power develops from such a 'mono-directional' refractive index gradient, the uniformity of the lens's refractive index at any point on the lens precludes this. Rather than astigmatism, it is distortion that will manifest as a visual compression or elongation of objects viewed through the progressive intermediate vision portion. The degree to which this occurs is dependent on the steepness of the gradient profile. More importantly, astigmatism in the lens of the present invention is dramatically reduced, and clear imaging may be achieved across the full width of the lens.

Within the last few years advances in polymer chemistry have yielded very high refractive index materials suitable for use in ophthalmic lenses, some with refractive indices above 1.7 and others even approaching 1.8. By using one of these or other high refractive index optical materials in conjunction with a compatible low refractive index optical material, having a refractive index between 1.3 and 1.5, for example, a gradient refractive index profile with a large refractive index difference suitable for use in the present invention may be produced. As a result, a lens according to the present invention may be produced with a minimum center and edge thickness. For example, in one embodiment of the invention a 48 mm diameter lens providing '0' power through the distance portion of the lens and 2.5 diopters of add through the near vision portion of the lens may be a thin as 1.76 mm center thickness and 1.13 mm edge thickness.

Various spraying, mixing, diffusion or other processing methods may be utilized to provide the desired gradient index characteristics in a consistent and repeatable manner. For example, a spraying technique using 2 or more spray guns, each containing a mutually compatible resin of different refractive index, moving together along a linear or arcuate path and producing a combined deposit with overlapping or common deposit areas from between 10 to 20 mm wide, for example, can create a varying blend of the component resins over the extent of the common deposit. Depending on the size and shape of each sprayed deposit, the overlapping or common section will comprise a varying volume of material from the adjacent guns, with the greatest amount of material from each gun closest to the center of its deposit area and the least amount furthest towards the edge of its deposit. A gradually and continuously changing composite mixture of the two resins over this common area, following the above described sine wave like progression, results in a corresponding change in refractive index from that of the one material to that of the other. The composite resin material can be chemically or photo polymerized or otherwise cured.

Another gradient index production method involves a controlled diffusion process using a dissolvable polymer membrane that defines a predetermined interface shape that separates two optical resins of different refractive index, and which once dissolved by one or both of the optical resins provides a precise liquid interface for diffusion to commence.

A further method involves the use of dispersed particles of particular density that facilitate and accelerate the mixing, blending and diffusion process by their transport through the liquid complex by gravity, buoyancy or centrifugal force. In the case of transport by gravity, for example, micron sized particles of high density are dispersed in the upper-most resin composition and through gravity fall and settle through the body of liquid, each particle introducing a small amount of an above portion resin of one refractive index into a below portion resin of a different refractive index, providing a thorough mixing and blending of the two adjacent liquids within an area and over an extent beneath the original interface. Once the particles fully settle out the liquid composition can be chemically or photo polymerized or otherwise cured.

The lens of the present invention may comprise two, three or multiple layers. In some embodiments of the invention a layer of generally constant refractive index provides either a posterior or anterior surface on which to incorporate a patient's prescription.

In some embodiments of the present invention reverse refractive index gradient profiles are used in adjacent plus power and minus power layers to effectively increase or double the refractive index difference, thereby providing a means of achieving high add values with lower or flatter curvatures and reducing lens thickness to a minimum. At least one pair of reverse gradient refractive index sections is required to achieve the increase in refractive index. For example, if a refractive index gradient profile defines a maximum refractive index difference of 0.3, by using 1) a gradient refractive index layer wherein the high refractive index portion comprises the lower near vision portion of a plus power layer, in combination with 2) a reverse gradient refractive index layer wherein the high refractive index portion comprises the upper distance vision portion of an adjacent minus power layer, the effective refractive index difference is doubled to equal 0.6. This very large index difference may be used advantageously to provide a high diopter progressive add power in a thin lens design in accordance with the present invention.

In another embodiment of the invention the lens consists of numerous thin layers of alternating refractive index gradient layers with reverse profiles and power values. For example, a 50 mm diameter composite lens providing 2.5 diopters of add power may comprise 13 low curvature layers each having a critical thickness as low as 0.22 mm while the overall lens thickness may approximate that of a standard lens of similar add power. Plus power layers with an increasing refractive index and increasing plus power in one direction 0.22 mm in center thickness alternate with adjacent minus power layers having an increasing refractive index and increasing minus power in the opposite direction, 0.22 mm in edge thickness, thereby producing what may appear to be a plano power lens or window 1.5 mm thick, but actually what is a progressive lens with substantial add power. By using alternating gradient refractive index layers in this manner the effective refractive index difference is increased as previously described. Because each layer is very thin and may be processed sequentially or independently, certain methods of manufacture that provide good blending results when thin sections are produced may be utilized to advantage. For example, the spraying method previously described is ideal for providing a thin layer of a gradient refractive index composition. Although it is desirable to the be able to spray in thick sections this will not always be possible as the density of one resin or monomer may be greater than the other, resulting in one sliding under the other by the pull of gravity. This problem can be avoided by limiting the volume of material applied and the time over which the spray application occurs when densities are substantially different. Each layer may be fully or partially cured or polymerized after application, and prior to subsequent layer applications. If the base surface upon which the spray is applied comprises a material with desirable flexural characteristics it may be altered in shape the small amount needed to produce the necessary convex and concave curvatures required to impart the correct radius for each gelled or partially polymerized layer.

There may be other reasons as well to limit the thickness of an application layer. For example, some photo polymerization processes or materials provide suitable results only to limited depths of the resin or monomer. Other processes designed to change the refractive index of a polymer, such as electron beam irradiation or chemical treatment with a penetrating reactive diluent or swelling agent, may provide suitable results only to limited penetration depths or through relatively thin sections, thus the independent or sequential processing of very thin adjacent layers as described may be accomplished by these means.

In another embodiment of the invention the gradient index progressive lens takes the form of a doublet Fresnel lens, which may be a diffractive lens, comprising one or two gradient refractive index layers. A Fresnel lens surface comprises numerous discontinuous coaxial annular sections each defining a slope corresponding to a continuous lens surface geometry, collapsed to form a surface of lower profile. Joining each annular section is a non-optically functional step that in conjunction with the refracting surfaces determines the overall geometry and lens thickness. High plus and minus powered Fresnel lenses may be produced at a fraction of the thickness of conventional lenses, many with a maximum step height under 0.26 mm. By applying a gradient refractive index layer thick enough to fill the open areas of a short focal length Fresnel surface, for example, 0.3 to 0.4 mm thick, a progressive lens of the present invention may be achieved in an extremely thin lens configuration. Here again the above-described spraying technique provides an ideal method of application of a gradient refractive index layer 0.3 to 0.4 mm thick. The use of two novel Fresnel lens designs providing increased efficiency and effectiveness of the present invention is described.

The lens of the present invention may be designed in a number of typical lens shapes or forms utilizing either spherical or aspheric curvatures. By shape or form is meant the general overall contour of the lens, that is, whether its front and back surfaces are flatter, having a lower value base curve, or more highly curved, with a higher value base curve. Excellent optical quality may be obtained using spherical surfaces over a wide range of forms, with particular forms providing improved performance over others. Generally speaking, lens forms which are normally considered to be highly curved for spectacle lens applications tend to perform better and produce less marginal astigmatism at the standardized spectacle lens distance from the eye than less highly curved forms. In the case of a spherical lens design incorporating plus or minus power to meet a patient prescription, a particular corresponding form may provide the best performance. Alternatively, by using the appropriate conic constant to aspherize those designs that require correction of marginal astigmatism, aberration can be minimized and the optical quality for a wide range of base curves and prescriptions can be optimized, thereby widening the choice of lens forms and allowing flatter base curves to be used without compromise of optical quality. For those lenses requiring a greater degree of astigmatic correction with higher conic constant values, a reduction in distortion or non-uniform magnification in the more highly powered portions of the lens may also be achieved. Slight aspheric over-correction with a higher conic constant value or additional aspheric terms may be employed to further reduce lens thickness or change the magnification characteristics of the lens as desired.

Other features and advantages of the invention will become apparent form the following description of the invention in conjunction with the accompanying drawings.

BRIEF DESCRIPTION OF THE DRAWINGS

FIG. 4 shows a table of lens parameters of the lenses illustratively depicted in FIGS. 1a, 1b and 1c.

FIG. 5 is a chart showing lens radius relationship values for different refractive index valued lenses having a range of add powers.

FIG. 8 is an illustrative side view of a second group of gradient index progressive lenses incorporating a single minus power refractive index gradient layer in a doublet lens configuration comprising a concave internal surface.

FIG. 9 is an illustrative side view of a third group of gradient index progressive lenses incorporating a single posterior plus power refractive index gradient layer in a doublet lens configuration comprising a concave internal surface.

FIGS. 10a, 10b and 10c illustratively show side views of fourth group of gradient index progressive lenses incorporating a single posterior minus power refractive index gradient layer in a doublet lens configuration comprising concave, plano and convex internal surfaces.

FIG. 17 is an illustrative side view of a gradient index progressive lenses incorporating a refractive index gradient in the form of an optimized triplet Fresnel lens in which the form of the lens is curved about the patient's eye.

FIG. 18 is an illustrative side view of a gradient index progressive lenses incorporating a refractive index gradient in the form of an optimized doublet Fresnel lens in which the form of the Fresnel lens is curved about the patient's eye.

FIG. 18a shows the lens of FIG. 18 with a protective layer.

DETAILED DESCRIPTION

The following is a disclosure of how to make and use the inventions described in the claims, including the best mode known to the inventor that the effect of filing date for carrying out the inventions claimed.

Figure 1:
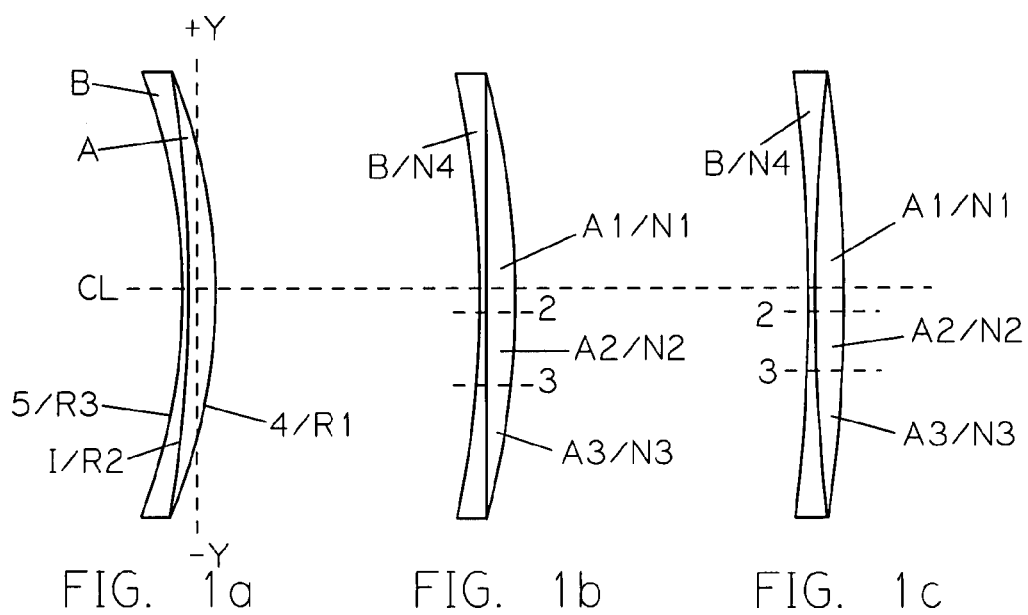
FIGS. 1a, 1b and 1c are illustrative side views a first group of gradient index progressive lenses incorporating a single plus power refractive index gradient layer in a doublet lens configuration comprising concave, plano and convex internal surfaces.

Referring to FIGS. 1a, 1b and 1c there are shown three doublet lens configurations of a first exemplary lens constructed following the precepts of this disclosure. FIGS. 1a-c represent three possible lens forms. Collectively, anterior lens section A comprises a gradient refractive index layer and posterior section B comprises a generally constant refractive index layer of the lens. By anterior is meant a front position and further from the eye and by posterior is meant a rear position and nearer the eye. Section A has plus power and section B has minus power. In this embodiment the refractive index increases through the progressive intermediate vision portion of the lens from the distance vision portion to the near vision portion, therefore providing progressively increasing power for intermediate and near vision.

Separately, FIG. 1a shows an embodiment wherein the internal interface curvature R2 is concave with respect to lens section A, FIG. 1b shows a lens embodiment wherein the internal interface curvature is plano, and FIG. 1c shows a lens embodiment wherein the internal interface curvature is convex with respect to lens section A. In the figures, surface and layer designations for the three figures are shown in FIG. 1a, and example gradient refractive index locations and extents are shown in FIG. 1b and FIG. 1c. Collectively, lens layer A is comprised of an optically transparent material having variable refractive index values. A1 corresponds to the distance vision portion of the lens, A2 corresponds to the progressive intermediate vision portion of the lens and A3 corresponds to the near vision portion of the lens. The progressive intermediate vision portion A2 is located between dotted lines 2 and 3 of the lens, which designate the lower aspect of the distance vision portion A1, whose refractive index is N1, and the upper aspect of the near vision portion A3, whose refractive index is N3, respectively. The refractive index N2 of the progressive intermediate vision portion A2 increases from a lower refractive index value equal to that of N1 of portion A1 adjacent A2 to a higher refractive index value equal to that of N3 of portion A3 adjacent A2, the gradient profile following a rate of change which is regular and continuous and which can be generally characterized across its extent as corresponding to the progression of a ½ sine wave or sine wave like curvature, from its π/2 to 3π/2 position. Posterior lens section B is comprised of an optically transparent material whose refractive index N4 is generally constant and which does not vary. Anterior surface 4 of lens section A has a convex curvature with a radius value R1, internal interface I has a curvature R2, and posterior surface 5 of lens section B has a concave curvature with a radius value R3. In this and subsequent embodiments and examples, lens sections may be produced as preforms and bonded together using an optical cement, or a succeeding layer may be cast against and bonded to the surface of a preformed section. By preform is meant a solid or semi-solid shape formed prior to the casting or cementing of a lens section. A perform lens section may be produced by thermoforming, molding, grinding, casting or other processes.

The following quadratic equation may be used to define the above mentioned sine wave type forms:

$$\text{Sin } f(x) = ax^2 + bx + c, \text{ wherein}$$

a=selected value generally between 2.0 and −2.0
b=1−(2aπ)
c=a*3π^2/4

Values of 'a' may be used to define various curves whose x,y coordinates correspond to the instantaneous refractive index of the gradient index layer at consecutive point along the extent of the gradient portion.

Figure 2:
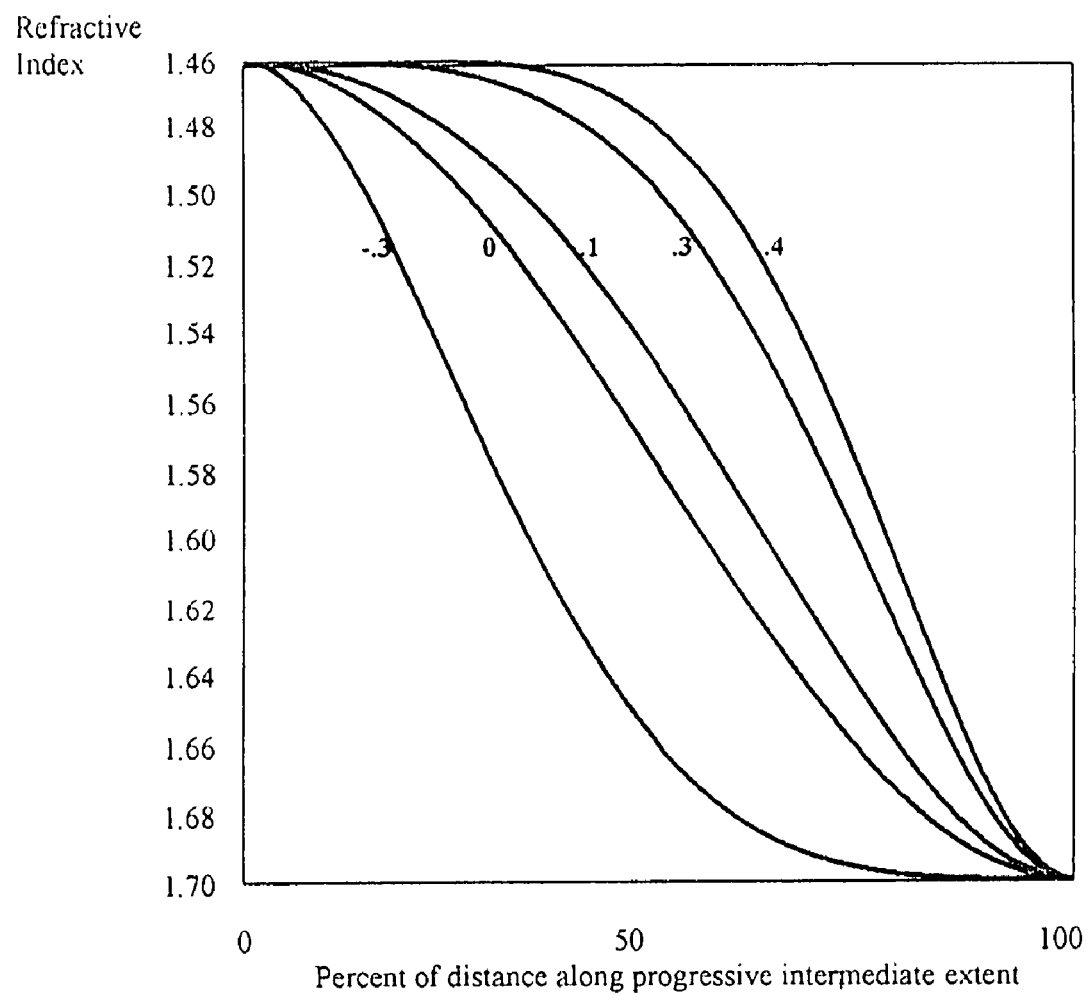
FIG. 2 shows a graph of various gradient refractive index profiles.

FIG. 2 shows a graph with 5 curvatures based on the above equation, plotting refractive index against Y. Y is the distance in millimeters over the extent of the progressive intermediate vision portion of the lens from dotted line 2 to line 3 shown below lens centerline CL shown in FIGS. 1$b$ and 1$c$. Example values of 'a' chosen are as follows: −0.3, 0, 0.1, 0.3 and 0.4. A value of '0' defines a sine wave shape, and may be considered as a standard for the lens of the present invention, as the curve demonstrates a rate of increase and decrease of refractive index which are equal, this being the case as the upper and lower sine wave portions have symmetry. In some instances the use of a non-symmetrical 'modified' sine wave curve may be preferred, wherein the derivative of curvature at the extrema are also 0. For example, when it is desired that the progressive addition be introduced at the junction of A1 and A2 in a rapidly advancing manner while conversely tapering off at the junction of A2 and A3 in a gentler fashion, a more accelerated rate of change of refractive index would be called for, as shown in the curve wherein a=−0.3. In other circumstances when it is desired that the progressive addition be introduced at a reduced rate while conversely tapering off in a more concentrated fashion, as likely would be the case with a shorter Y distance, a less accelerated rate of change of refractive index would be called for, as shown in the curve wherein a=0.4. Generally, positive values of 'a' are preferred over negative values, as the transition from distance vision to progressive intermediate vision experienced by the patient looking through a lens with a positive 'a' value will be less noticeable. It follows that with positive values of 'a' there may be required very slightly greater downward gaze to provide a similar amount of add power compared to a lens wherein 'a' is equal to '0' or is negative. Modification using positive values of 'a' becomes of greater importance when the progressive intermediate vision portion of the lens is short, on the order of 10 mm or less, in which case the concentrated refractive power change can cause a visual disturbance as the direction of gaze of the patient moves from the distance vision portion of the lens to the progressive intermediate vision portion of the lens. Furthermore, because the difference in objective focal distance between objects viewed through the lower part of A2 versus the upper part of A3 will be small, 16" verses 15.75", for example, and because the difference in objective focal distance between objects viewed through the upper part of A2 versus the lower part of A1 is greater, finite (17', for example) versus infinite, a reduced rate of refractive index change positioned at the A1 and A2 juncture will provide a more comfortable visual transition to the progressive intermediate vision portion of the lens. The result achieved mimics that of a lower add power progressive lens in terms of visual 'comfort' while still providing a high diopter of add power in the near vision portion of the lens.

The above-described sine wave models for the refractive index gradients have refractive index profiles that increase from a lower refractive index value equal to that of the adjacent portion with lower refractive index to that of the opposite adjacent portion with higher refractive index. Such gradient index profiles may be produced using a number of different processing methods. Inter-diffusion of two monomers at a liquid interface or diffusion of one monomer into a partially polymerized or gelled monomer of a different refractive index are methods that have been shown to provide useful refractive index gradients with high refractive index difference values. Mutual solubility or miscibility and inter-diffusive penetration of a lower viscosity monomer into a higher viscosity gelled 'pre-polymer' are the factors combined with heat and duration that determine the diffusion and refractive index gradient depth. These approaches work equally well with the more recently developed optical monomers and resins yielding very high refractive index values suitable for use in ophthalmic lenses, as previously mentioned. Materials containing for example disulfide, thiol, polythiol or polyisocyanate compounds and some epoxies have been shown to provide refractive indices between 1.65 and 1.78. Numerous methacrylate or other resins containing fluorine or fluoro polymers have refractive index values as low as 1.36 or below, and may suitably be used in conjunction with compatible high refractive index materials in spray or diffusion processes.

Due to the fact that slight disturbances or irregularities at the liquid interface of two monomers or resins used in a diffusion process can result in undesirable properties or deformities in the final gradient index profile, it is very important that the interface have no irregularities or undesirable contours, including the meniscus that typically may form along the top surface of a liquid in a vessel, such as a lens casting chamber or mold that may be used in the diffusion/casting process. Especially if the viscosity of the liquid optical resin is high, the meniscus formed at the lens chamber and resin boundary will be highly curved. If the lens casting vessel is narrow in its interior dimension the meniscus can be continuous across the interface, and of course will remain if the material is partially polymerized to a gel state. Whatever process is used to create the refractive index gradient, the interface generally should have a planar, cylindrical, or cylindro-aspheric, conical or similar shape, with the planar dimension extending perpendicular to the length of the interface, that is, through the lens.

Another similar problem relates to the application of one liquid monomer on top of or next to another and how to preserve the integrity of the interface during the application. Some have suggested the use of a removable separator or barrier, but ever so minute disturbances at the interface caused by the movement of the separator, especially when it is lifted from the pool of liquid, can be detrimental to the changing refractive index profile. Both problems may be solved by utilizing a new diffusion method involving the use of a dissolvable polymer membrane as a separator within the casting chamber.

Both resins may contact the separating membrane and following dissolution of the membrane by one or both of the resins, undergo inter-diffusion or diffusion of one resin into the other followed by full polymerization or curing of the resin complex mixture. The membrane should be thick enough so that it withstands the weight or pressure of a first resin introduced prior to the addition of the second resin in the adjacent chamber portion on the opposite side of the membrane, but thin enough to dissolve within a desired period of time, for example within 1 hour. A polymethylmethacrylate film membrane 0.012 to 0.025 mm thick may provide the desired attributes. A copolymer membrane having a refractive index as a mean or variable value between that of the high and low refractive index resins may also be used.

Figure 3A:
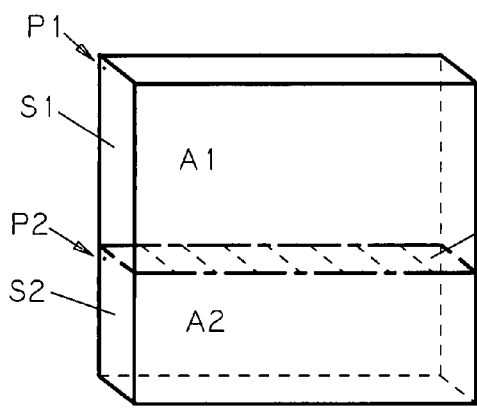
FIGS. 3a, 3b and 3c illustratively show resin casting chambers incorporating dissolvable membranes separating resin portions.

Referring now to FIG. 3a there is shown a casting chamber for the instant gradient index progressive lens including dissolvable membrane M1 sandwiched between vertical lens chamber sections S1 and S2. Section S1 corresponds to the distance vision portion A1 of the lens and section S2 corresponds to the near vision portion A2 of the lens. Chamber S1 is filled with one refractive index resin and chamber S2 is filled with the other refractive index resin through ports P1 and P2 respectively. Only if the resin of a lower section is gel polymerized prior to the dissolving of the membrane may the density be less than that of the resin of an upper section, otherwise the resin having greater density should be placed in the lower portion to avoid undesirable mixing and resettling of the liquid resins once the membrane dissolves. If the resins have the same density either may be positioned in the upper or lower section, furthermore the sections may be positioned side by side. During or near the end of the filling process the casting chamber may be tilted to insure air bubbles are allowed to escape through filling ports P1 and P2.

Figure 3B:
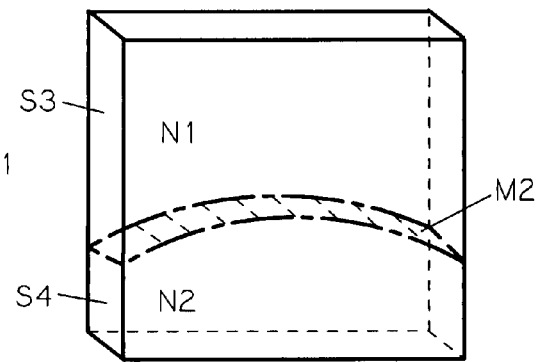

Once the chamber portions are filled, the membrane should be allowed to dissolve into one or both of the resins at which time the diffusion process will begin. After the required diffusion takes place, creating the desired gradient index profile, the lens resins may be fully polymerized by either photo or catalyst polymerization. FIG. 3b in like manner shows a cylindrically shaped curved membrane used to create a curved interface. Curved membrane M2 is sandwiched between lens chamber sections S3 & S4 creating refractive index resin sections N1 and N2.

Figure 3C:
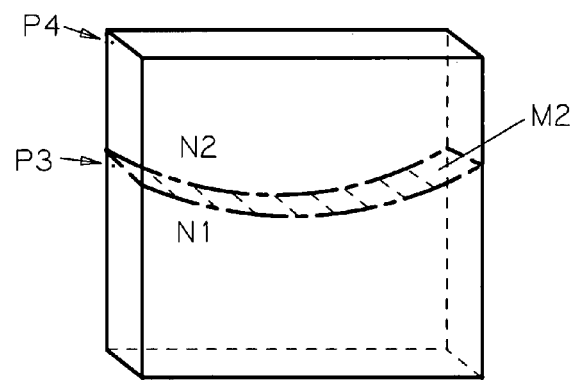

Although not shown in the figures, the membranes may be pitched in a forward or backward direction to create a sloped refractive index orientation angle. In such instances the mold chamber may be tilted to the same slope angle during the diffusion and polymerization processes to insure the interface maintains the desired slope angle. The resins may be filled with the mold chamber tilted as described before in order to allow escape of air bubbles through the filling ports. Furthermore, as shown in FIG. 3c, the chamber of FIG. 3b may be positioned and used in an upside down orientation to insure any residual air bubbles will not be trapped in the central area of the downward facing concavity of membrane M2, but instead will rise and follow the curvature of the membrane upward to the far left or right side of the mold chamber towards filling ports P3 and P4, out of the area of the optical portion of the lens.

Figure 22:
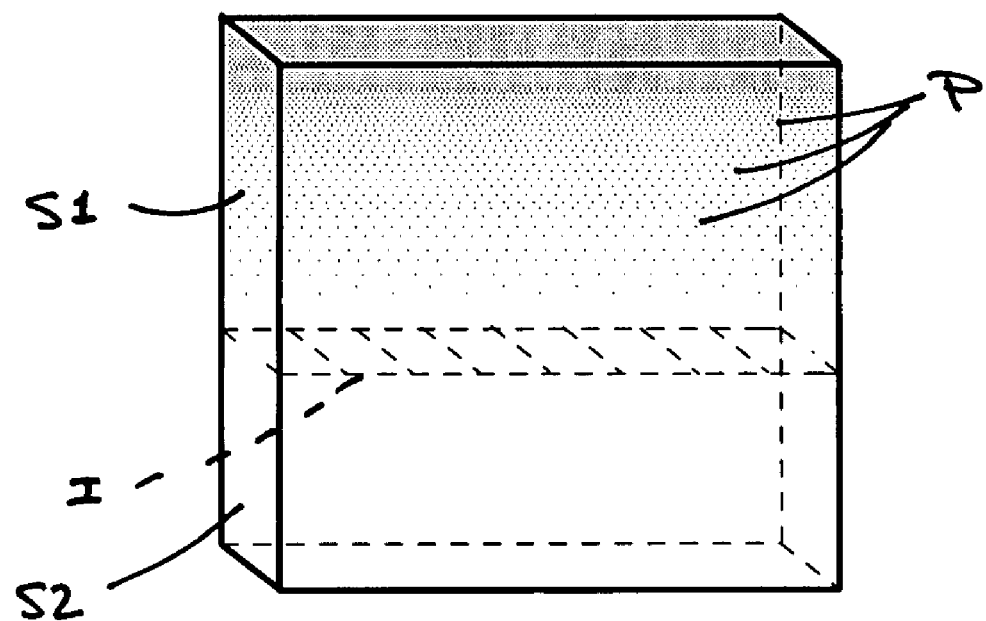
FIG. 22 illustrates the mixing of two liquids by particles descending through the interface separating the liquids.

An additional method to facilitate and quicken the creation of the refractive index gradient interface involves the controlled mixing of resin or monomer solutions of different refractive index in a vessel or mold chamber such as the above-described membrane containing mold chamber. To this end, two or more vertically or otherwise adjacent layered component resin solutions of different refractive index can be blended at their interface(s) through the use of fine particles, such as glass beads, dispersed in the top layer solution. FIG. 22 illustrates this process schematically in a vertically oriented mold arrangement. In FIG. 22, particles P (not to scale) are shown as they begin their descent through the upper liquid in the upper lens chamber section S1 toward and through the interface I (indicated by dashed lines in the middle of a mold chamber). The particles P are shown as being concentrated in the upper portion of the top layer solution, but they could as well be dispersed evenly through the upper liquid. Either way, they slowly settle through the upper liquid and through the interface I. The particles settle through gravity or centrifugal force into and through the lower layer solution or solutions, and in so doing create a gradient blend zone below the original interfacial level. The particles may be up to 50 microns in diameter, for example, with the concentration of the particles, as well as their size being selected to control the extent of the blend. While the use of particles is illustrated in connection with forming a lens having two refractive indices joined by a gradient refractive index, it can also be practiced with multiple blends in connection with the lens making techniques shown and described herein.

Gravity and centrifugal force are not the only forces and fields that may be used to move the particles through the layer(s) of solution(s). With charged particles or particles influenced by magnetic fields, electric and/or magnetic fields may be used. However it is propelled, each falling and settling particle from the above layer solution drags with it a small amount of the above layer solution through the interface into the adjacent below layer solution where it is cleaned of the single component resin covering as it passes through the liquid. Not only does the particle carry the resin from the above layer solution to the adjacent below layer solution, it also micro-mixes the solution in the area it passes through. Conversely, particles with a density less than that of the resins used in casting the lens may be dispersed in the lowest layer solution which due to buoyancy will rise through the solutions and in like manner produce the refractive index gradient(s). The particles will rise to the top of the chamber out of the useful area of the lens body. Either or both rising and settling particles may be used to produce a refractive index gradient(s). As stated, this method may be used in molding or casting chambers including or absent of the membrane system previously described. The process may also be implemented in a mold arrangement wherein the layered resin solutions are situated side by side, in which case a field other than gravity will be required to provide a sideways motion of the particles from one adjacent solution to the other.

In accordance with the invention the location of lines 2 and 3 shown in FIG. 1b and 1c may vary significantly in the Y direction. As shown in FIG. 1b, Line 2 may be located 2 mm below a centerline CL and line 3 may be 18 mm below line 2, thereby providing a progressive intermediate vision portion whose span between the upper distance vision and lower near vision portions is 18 mm, Alternatively, for example, as shown in FIG. 1c, line 2 may be 3 mm below centerline CL and line 3 may be 10 mm below line 2, thereby providing a progressive intermediate vision portion whose span between the upper distance vision and lower near vision portions is 10 mm. The extent of the progressive intermediate vision portion of the present lens may be made shorter than typically provided in aspheric progressive lenses without introducing vision degrading astigmatism typical of the aspheric progressive designs. This particular attribute presents a significant advantage of the gradient index design taught by this disclosure over aspheric progressive lens designs. A so-called 'softer' lens as taught by this disclosure is achieved when the Y extent of the progressive intermediate vision section is greater, as in the version with the 18 mm span, and a so-called 'harder' design is achieved when the Y extent of the progressive intermediate vision section is reduced, as with the 10 mm span. As previously described, the gradient profile follows a rate of change which is regular and continuous and which can be generally characterized across its extent as corresponding to the progression of a ½ sine wave or sine wave like curvature, from its $\pi/2$ to $3\pi/2$ position, thus there will no perceived discontinuity in the transition from distance to progressive intermediate to near vision.

FIG. 4 is a table listing relational values for spherical curvatures R1, R2 and R3, representing example lenses illustratively depicted in FIGS. 1a, 1b and 1c. Each of the lenses 1 through 7 has a constant edge thickness of 0.05 mm for lens section A and a constant center thickness of 0.25 mm for lens section B, with total lens center and edge thicknesses varying only slightly over the range of example lens forms as indicated in the table. The two columns on the far right include conic constant values and additional information for aspheric versions of each of the examples. In FIG. 4 and all subsequent lens examples, conic constant, designated CC, is listed along with radius R, center thickness CT and edge thickness ET in millimeters, and is identified with an (a) for anterior and (p) for posterior indicating the lens surface for which it has been calculated. Radii, center thickness and edge thickness values pertain to spherical lens versions only. Lenses 1 through 7 provide '0' diopters of power in the distance vision portion and 2.5 diopters of add power in the near vision portion of the lens. Add power of this and all other lenses is in terms of diopters and calculated as 1000/effective focal length. The selection of '0' power in the distance vision portion of the lens represents a standard for distance vision assuming an emmetropic eye, and is calculated as equal to an effective focal length not less than +/−1e+009. The lenses of the present invention of course will require modification such as lab work when incorporating a patient's prescription, but as any prescription value is in terms of diopters departure from emmetropia, the basic reference of '0' power, corresponding to emmetropia, will be maintained for all calculations throughout this writing. All radii and power calculations are based on refractive index, nd, calculated at the helium d-line (587.56 nm). Alteration of surface 5 to incorporate a patient's prescription needs or provide other function will modify both the distance and near vision power but will not change the add power provided by the lens. The lenses have the additional following refractive index parameters:

N1=1.46
N2=1.46 to 1.7 gradient
N3=1.7
N4=1.58

With the refractive indices, add powers, lens layer thicknesses and '0' power for distance maintained constant as stated, there may be seen an additional constant with regard to the relationship of R1, R2 and R3 over a full range of possible lens forms, as exemplified, expressed as the curvature relationship and efficiency number or CREN, as listed in FIG. 4. The CREN is a numeric value that defines the relationship between the radii of the surfaces of a lens constructed according to this disclosure, based on the '0' power standard described above and stated in terms of diopters. It also represents the total convex diopter curvature attribute or 'gross sag' of a lens, and will in every case will be a positive value and greater than the add power of the lens. Each lens constructed according to this disclosure can be defined by a CREN number, and as such CREN values for all subsequent lens examples are listed with other defining lens parameters. It is the nature of the lens made following the precepts of this disclosure that it requires extra bulk or 'convexity' to provide add power through refractive index change in conjunction with a symmetrically rotational surface. Furthermore, the increased plus power of lens layer A needed to achieve the add value or power difference between the distance and near vision portions of the lens must be reduced to the reference '0' power or patient prescription value in the distance vision portion of the lens by the minus power portion B, thus the 'gross sag' of the lens will be further increased. The CREN number may range from between 40 and 50 for lenses with add powers from 1 to 3.5 diopters, when the efficiency is lowest and the bulk is greatest, to between about 3 and 11 for the same add powers when the efficiency is highest and the bulk is least. Such a high efficiency value allows for a lens with minimal thickness. The CREN may be calculated by the following formula:

$$1000/R1+2(1000/R2)+1000/R3=CREN,$$

wherein R1 is positive when convex and negative when concave, R3 is positive when concave and negative when convex, and R2 is positive when its curvature is convex with respect to lens section A and negative when its curvature is concave with respect to lens section A. For lenses that incorporate a power other than '0' in the distance vision portion of the lens, the CREN may be determined by first canceling the added power or prescription value and then doing the calculation. Lenses having a low CREN are most desirable as their bulk and critical thickness will be least. The CREN number is highest when the refractive index difference (RID) between the upper and lower aspects of the lens is least, on the order of 0.08 to 0.16, as shown at the top portion of the table, and lowest when the RID is greatest, on the order of 0.60 or greater, shown at the bottom portion of the table. Medium and high RID values can be obtained by using both very high and very low refractive index component optical resins together to create the gradient refractive index profile of section A. The example lenses of the present embodiment have a RID value of 0.24 (1.7−1.46=0.24). If the two component materials selected for use in the gradient refractive index layer have relatively higher or lower refractive index values than in the example lenses above, yet produce the same RID value, the calculated values for R1 and R2 will be substantially the same, but R3 and therefore the calculated CREN value will be different with no change in the refractive index of section B. By adjusting the refractive index of section B in a corresponding direction, identical values for R3 and CREN may be produced, nonetheless in order to achieve a low CREN value and superior optical quality the refractive index of layer B should be high. Higher RID values may be obtained by using component optical resins with a greater refractive index difference. For example, a 0.32 RID value may be obtained by using a 1.42 low refractive index resin component in conjunction with a 1.74 high refractive index component to create the gradient refractive index profile. The lens' RID value may also be increased in accordance with the methods taught by this disclosure to a value double the maximum value of the refractive index difference of two component resins, i.e. 0.64, by means outlined in the fifth and sixth embodiments.

FIG. 5 is a table listing the CREN values of a complement of lenses of the first embodiment according to the RID of the gradient refractive index layer(s) and add power of the lens. The refractive index values for all calculations are those listed above with reference to FIG. 4. Add powers in the table range from 1 to 3.5 diopters. The CREN numbers for the example lenses above, having all parameters the same except for lens form, range from 18.436 to 18.729, and define the major portion of the 18.07-19.10 range listed in the category at the intersection of the 0.24 RID and the 2.5 diopter add. The category range on the chart has been widened by 2% beyond the numerical range of the example lenses to 18.07-19.10 to include additional lens forms not included in FIG. 4. The other category ranges in FIG. 5 likewise have been widened by 2%. The 18.07-19.10 CREN range represents a very usable but just medium efficiency group of gradient refractive index lenses of made following this disclosure.

As can be seen from the table, the lower CREN number ranges, representing the most efficient designs, are located where add power is least and RID values are greatest. Lower add powers obviously will require less refractive index change, just as with aspheric progressive lenses less curvature change is required. The most efficient CREN category on the chart, 3.05-3.19, designates a total of approximately 3 diopters of bulk or 'gross sag' to provide 1 diopter of add. With high CREN values greater bulk translates to steeper R1 and R3 curvatures, even with convex internal interface radii. Therefore for higher CREN values there naturally will be a corresponding limitation of the forms that are useful. For example, a 3.5 diopter add lens with a 0.16 RID and a CREN value of 41.18 will be quite steep on both its anterior and posterior surfaces, having a convex R1 curvature of 80.0 mm and a concave R3 curvature of −102.242 mm, even though the interface curvature has a steep convex R2 radius of 105.809 mm. The same 3.5 diopter add lens with the same 0.16 RID value having a concave internal interface R2 curvature of −400 mm will have a convex R1 curvature of 42.739 mm and a concave R3 curvature of −46.144 mm and a CREN value of 40.07. Although the steeper lens demonstrates better optical quality compared to the one with an R1 curvature of 80.0 mm, from a cosmetic standpoint such a highly curved lens would likely be undesirable. Nonetheless each of the CREN ranges of FIG. 5 are calculated from a range of lens forms including steeper versions such as the one above. CREN categories above 50, representing very inefficient designs, are not included in the chart as the thickness, weight and high curvature of lenses producing these CREN values will have limited usefulness.

The table also shows the approximate maximum RID of a first layer of gradient refractive index, or in the case where only one lens layer comprises a gradient refractive index, the maximum RID of the lens. The demarcation, situated at the 0.32 RID level, is based on the use of available compatible optical resins having both extremely high and extremely low refractive indices. It is anticipated that other materials with both higher and lower refractive indices may be used to create a greater RID, and in such case the potential CREN may be lower. It is also possible, as previously mentioned, to use two gradient refractive index profiles in reverse orientation to increase the RID and lower the CREN. In such a case values beyond the first line and up to the 'Approximate maximum RID of the lens' will be applicable. Alternatively, when two reverse orientation gradient refractive index layers are produced with materials of more moderate refractive index, such that the RID value of each is less than that of layer A in the example lenses of FIG. 4, the additive RID may still surpass that of a lens with only one gradient refractive index layer with a maximum RID value, producing a very efficient and thin lens. As indicated above, a family of lenses having various constants including refractive index, RID, add power, constant edge thickness of 0.05 mm for lens layer A and a constant center thickness of 0.25 mm for lens layer B, may assume a variety of shapes defined by a specific relationship between R1, R2 and R3, calculated as the CREN value.

Figure 6:
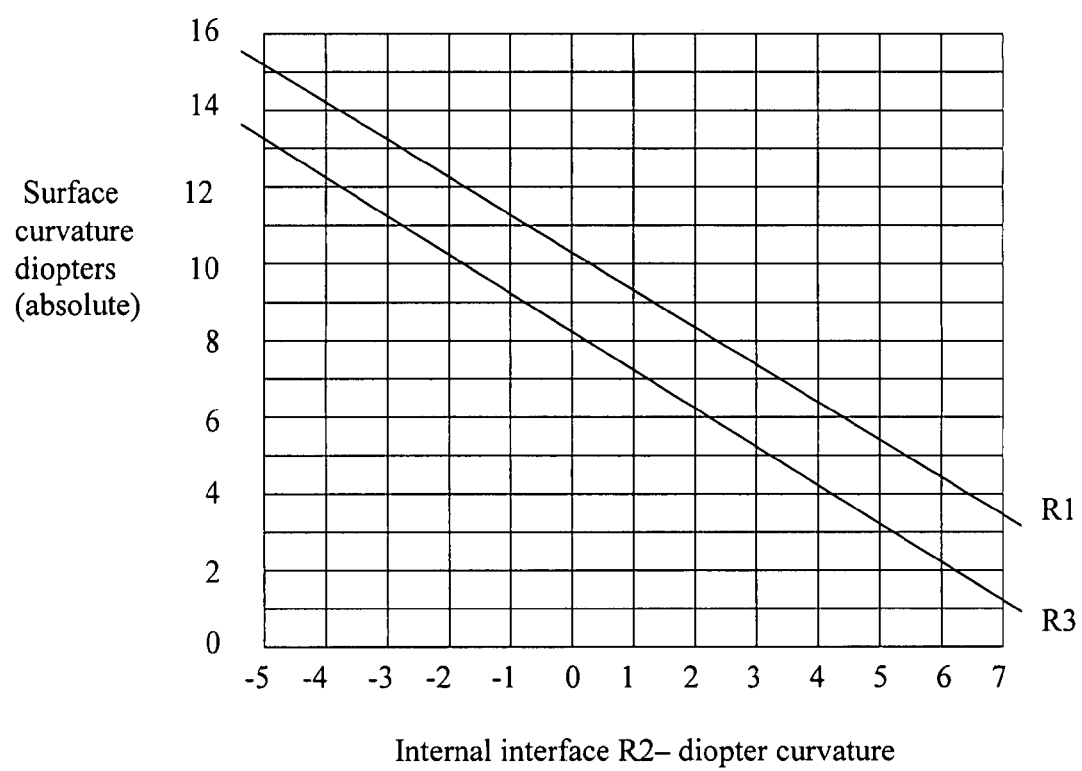
FIG. 6 shows a graph plotting anterior and posterior surface curvatures against internal surface curvature of the gradient refractive index lens.

With different base curves and lens shapes, therefore, R2 must be a specific value to achieve the add power(s) and specified standard of '0' power through the distance vision portion of the lens. From FIGS. 1a, 1b and 1c and FIG. 4 it can be seen that over a range of possible lens shapes, R2 corresponds to R1 and R3 typically by exhibiting a bending in the direction of greater convexity (with respect to lens layer A) with flatter convex R1 and concave R3 curvatures and in the direction of greater concavity (with respect to lens layer A) with steeper convex R1 and concave R3 curvatures. FIG. 6 graphically depicts this relationship by plotting diopters of curvature of R1 and R3 against a range of diopter values of R2. The graph plots the example CREN family of lenses of FIG. 4 with concave, plano and convex internal interface R2 curvatures, and satisfies the CREN equation listed above, which converted to surface diopters is $$D1+2 \cdot D2+D3=CREN,$$

thus further illustrating the unique and identifying character of lenses made following this disclosure. The relational values shown of course will change when the refractive index values N1, N2, N3 and N4 are different than those of the example lenses.

As mentioned, excellent optical quality may be obtained using spherical surfaces over a wide range of forms, with lenses having what are typically considered to be more highly curved surfaces tending to produce less marginal astigmatism and better focus. The magnitude of the conic constant values shown in FIG. 4 indicates the degree to which correction is required and which example lens designs perform better with little or no aspherization. Clearly the #7 lens example, which has the highest CREN value and flattest R1 and R3 curvature values requires the greatest amount of correction, calculated as a theoretical conic constant value of −14.879. Conversely, the steeper #1 lens, for example, with the lowest CREN value, requires almost no correction at all. It should be noted that correction of the lens made following this disclosure with aspheric curvatures cannot provide optimal visualization for all lens portions as the power and therefore the amount of correction will vary across the lens. Generally speaking, less correction is required for the upper distance vision portion of the lens regardless of its form, therefore conic constant values lower than those listed for the flatter form lenses may be selected so that some correction is achieved without loss of optical quality in the distance vision portion of the lens. A somewhat steeper lens form requiring less aspheric correction may provide an alternative when the cosmetic appeal of a very flat lens is not the primary concern, and in the case of the example lenses of FIG. 4, lens #6, for example, would provide an excellent alternative to lens #7.

Since there is no single radius value defining an aspheric surface that can be used to accurately calculate the CREN value, substituting a best fit sphere for each aspheric surface will provide a more accurate calculation of the CREN number. The radius of the best fit sphere for lenses with negative conic constant values will always be less highly curved than the apical radius of curvature of the conic, and therefore the calculated CREN number will be lower. For example, using a best fit sphere radius of 195.1687 mm instead of the apical radius of curvature of the aspheric surface of lens #7 (not listed), the recalculated CREN number is 18.419. This value by comparison is closest to the CREN value of lens #1, which calls for almost no correction. All recalculated CREN numbers derived by using best fit spherical counterparts for the aspheric versions of lenses #1 through #7 are listed in the table of FIG. 4. As can be seen all the best fit sphere CREN values are very close to one another and to the CREN number of lens #1, which may be practically optimal from the standpoint that it requires no aspheric correction. Thus a narrow CREN range can be said to define a family of lens forms sharing common optical traits. This notwithstanding, a wider CREN range as previously described, rather than the more narrow range as exemplified in FIG. 4, is listed in the table of FIG. 5 in case non-corrected spherical lens versions are utilized.

Figure 7A:
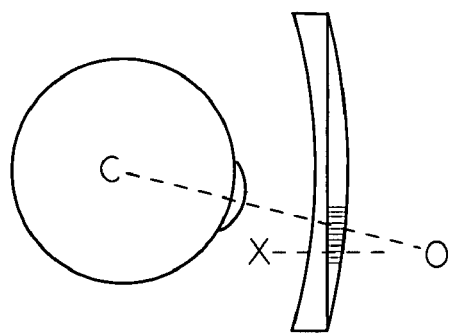
FIGS. 7a, 7b, 7c and 7d illustratively show different orientation angles of a refractive index gradient lens layer.

FIGS. 7a, 7b, 7c and 7d show four versions of the first exemplary lens following the teachings of this disclosure. In FIGS. 7a-d the orientation angles X of the refractive index gradient differ. By orientation angle of the refractive index gradient is meant the angle that defines at least a portion of a surface, such as a plane, that intersects the refractive index gradient in which there is substantially a constant refractive index. By appropriately selecting the refractive index gradient orientation angle, vision through the refractive index gradient(s) of the lens at a particular angle of gaze of the patient, represented by lines CO in the Figures, will be optimized and free of aberration and blur that otherwise may result when a line of sight of the patient through the gradient is at an angle wherein the refractive index is not constant, as can occur when the orientation angle is '0' or different than the angle of gaze, as illustrated in FIG. 7a.

Figure 7B:
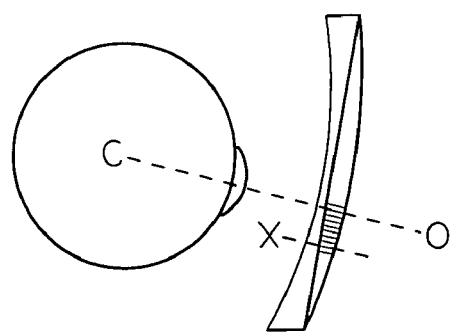

There are two ways to achieve an orientation angle that approximates or equals the angle of gaze of the patient looking through a refractive index gradient area of the lens. The first involves tilting of the lens in the spectacle frame with respect to the angle of gaze of the patient when looking in a generally straight ahead direction through the center portion of the lens. Such a positive angle of tilt is on the order of 8°, with the upper distance portion of the lens pitched forward with respect to other areas of the lens, as shown in FIG. 7b. Not only does a small tilt satisfy the orientation angle criteria with respect to the upper section of the progressive intermediate vision portion of the lens, it also may provide somewhat improved visualization of objects viewed through the lower portion of the lens, as the bundles of rays passing from a viewed object to the eye and passing through the lens do so at an angle more nearly normal to the surface location through which the light bundles are transmitted.

Figure 7C:
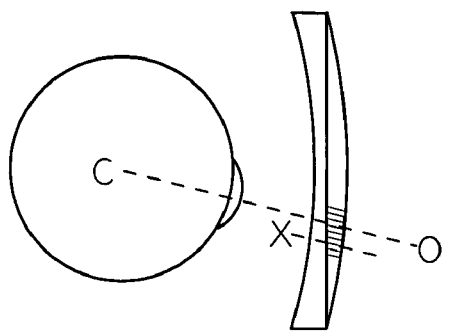
Figure 7D:
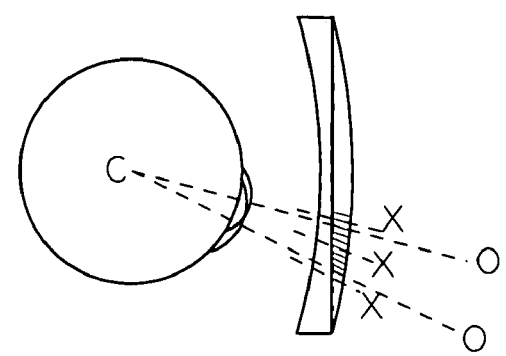

A second way to achieve a positive gradient index orientation angle is to tilt the gradient medium within the gradient index section to correspond more closely to the angle of gaze when a patient looks through a selected area of the progressive intermediate vision portion of the lens, as shown in FIG. 7c. The orientation angle X may also vary through the progressive intermediate vision portion of the lens to correspond even more closely to the instantaneous angle of gaze through the entire gradient index portion, as shown in FIG. 7d where the orientation varies from approximately 8° to 18°. It is also possible to achieve the desired gradient index orientation angle by combining a forward pitch of the lens with a constant or variable tilt of the gradient medium with the lens. Although the visual disturbance resulting from an orientation angle not corresponding to the angle of gaze of the patient can never be completely avoided, as the pupil of the eye is not a point but rather covers an area averaging 4 mm in diameter in daytime viewing, nonetheless an improvement in vision may be achieved by adjusting the gradient index orientation angle. This is less important when the extent of the progressive intermediate vision area is greater, on the order of from 15 to 20 mm, and more important when the extent of the progressive intermediate area is small, on the order of from 10 to 15 mm. The gradient index orientation angle is comparatively more important, when the gradient index portion comprises only the plus power portion of the lens (as specified in the present embodiment). In this case the patient gazing straight ahead will be looking through the thickest portion of the gradient index section. The gradient index orientation angle is comparatively less important when the gradient index portion comprises only the minus power portion of the lens. In such a case the patient gazing straight ahead will be looking through the thinnest portion of the gradient index section. A minus power transverse gradient index embodiment as described is shown in FIG. 8.

Referring to FIG. 8 there is shown a doublet lens configuration of a second embodiment of the invention. Anterior lens section A comprises the gradient index section of the lens and section B comprises the generally constant refractive index section of the lens. Section A has minus power and section B has plus power. In the two examples provided the internal interface curvature R2 is concave. In this embodiment the refractive index decreases through the progressive intermediate vision portion of the lens from the distance vision portion to the near vision portion, therefore providing progressively increasing power for intermediate and near vision.

Lens layer A in FIG. 8 is comprised of an optically transparent material having variable refractive index values. A1 corresponds to the distance vision portion of the lens, A2 corresponds to the progressive intermediate vision portion of the lens, and A3 corresponds to the near vision portion of the lens. The progressive intermediate vision portion A2 is located between dotted lines 2 and 3 of the lens, which designate the lower aspect of the distance vision portion A1, whose refractive index is N1, and the upper aspect of the near vision portion A3, whose refractive index is N3, respectively. The refractive index N2 of the progressive intermediate vision portion A2 decreases from a higher refractive index value equal to that of N1 of portion A1 adjacent A2 to a lower refractive index value equal to that of N3 of portion A3 adjacent A2, the gradient profile following a rate of change which is regular and continuous. The refractive index orientation angle of 8° as shown indicated by dotted lines 2 and 3 is obtained by tilting the refractive index medium within the body of the lens, and the extent of the gradient refractive index progressive intermediate vision portion located between dotted lines 2 and 3 is 12 mm.

Posterior lens section B in FIG. 8 is comprised of an optically transparent material whose refractive index N4 is generally constant. Anterior surface 4 of lens layer A has a curvature with a radius value R1, internal interface I has a curvature R2, and posterior surface 5 of lens section B has a curvature with a radius value R3.

As with the prior example, values for R1, R2 and R3 are based on the lens providing 0 power in the distance vision portion and 2.5 diopters of add power in the near vision portion of the lens. In this and all subsequent lens examples the orientation angle of the refractive index gradient in degrees (designated OA) and the extent of the progressive intermediate vision portion in millimeters (designated IE) will be listed with refractive index, CREN, radii and thickness values in millimeters. Exemplary Values for the parameters of 3 gradient index progressive lenses according to this embodiment are as follows:

|       | Example #1   | Example #2   | Example #3   |
| ----- | ------------ | ------------ | ------------ |
| N1 =  | 1.70         | 1.74         | 1.74         |
| N2 =  | 1.70 to 1.46 | 1.74 to 1.42 | 1.74 to 1.42 |
| N3 =  | 1.46         | 1.42         | 1.42         |
| N4 =  | 1.66         | 1.74         | 1.74         |
| R1 =  | 92.977       | 87.336       | 211.928      |
| R2 =  | −47.508      | −52.101      | −80          |
| R3 =  | −97.169      | −86.168      | −210.817     |

-continued

|        | Example #1 | Example #2 | Example #3 |
|--------|------------|------------|------------|
| CC =   | .0155(a)   | .0244(a)   | −18.340(a) |
| OA =   | 8°         | 8°         | 8°         |
| IE =   | 12         | 12         | 12         |
| CT =   | 3.797      | 2.747      | 2.614      |
| ET =   | 3.657      | 2.795      | 2.621      |
| CREN = | 21.051     | 15.332     | 15.538     |

FIG. 9 shows a doublet lens configuration of a third exemplary lens following the precepts of this disclosure. Anterior lens section A in FIG. 9 comprises a generally constant refractive index section of the lens and section B comprises the gradient index section of the lens. Section A has minus power and section B has plus power. In the two examples provided the internal interface curvature R2 is concave with respect to lens section A. In this example the refractive index increases through the progressive intermediate vision portion of gradient lens section B from the distance vision portion to the near vision portion, therefore providing progressively increasing power for intermediate and near vision.

Using similar conventions for identifying and defining the lens as shown in the previously illustrated examples, posterior lens layer B in FIG. 9 is comprised of an optically transparent material having variable refractive index values. B1 corresponds to the distance vision portion of the lens, B2 corresponds to the progressive intermediate vision portion of the lens, and B3 corresponds to the near vision portion of the lens. The progressive intermediate vision portion B2 is located between dotted lines 2 and 3 of the lens, which designate the lower aspect of the distance vision portion B1, whose refractive index is N1, and the upper aspect of the near vision portion B3, whose refractive index is N3, respectively. The refractive index N2 of the progressive intermediate vision portion B2 increases from a lower refractive index value equal to that of N1 portion B1 adjacent B2 to a higher refractive index value equal to that of N3 of portion B3 adjacent B2, the gradient profile following a rate of change which is regular and continuous. Anterior lens section A is comprised of an optically transparent material whose refractive index N4 is generally constant and which does not vary. Anterior surface 4 of lens section A has a curvature with a radius value R1, internal interface I has a curvature R2, and posterior surface 5 of lens section B has a curvature with a radius value R3. The refractive index orientation angle of 8° as shown indicated by dotted line 2 is obtained by tilting the lens with respect to the angle of gaze of the patient. Both lenses have a progressive intermediate vision extent of 10 mm.

Values for R1, R2 and R3 are based on the lens providing 0 power in the distance vision portion and 2.0 diopters of add power in the near vision portion of the lens.

|      | Example #1  | Example #2   |
|------|-------------|--------------|
| N1 = | 1.46        | 1.46         |
| N2 = | 1.46 to 1.70| 1.46 to 1.70 |
| N3 = | 1.70        | 1.70         |
| N4 = | 1.66        | 1.66         |
| R1 = | 80.226      | 188.049      |
| R2 = | −55.0       | −90.0        |
| R3 = | −99.163     | −355.981     |
| CC = | 0.085(p)    | 68.383(p)    |
| OA = | 8°          | 8°           |
| IE = | 10          | 10           |
| CT = | 2.879       | 2.738        |

-continued

|        | Example #1 | Example #2 |
|--------|------------|------------|
| ET =   | 2.154      | 2.010      |
| CREN = | 13.777     | 14.119     |

FIGS. 10a, 10b and 10c show three doublet lens configurations of a fourth exemplary lens constructed according to the teachings of this disclosure. Collectively, anterior lens section A comprises a generally constant refractive index section of the lens, and section B comprises the gradient index section of the lens. Section A has plus power and section B has minus power. In this example the refractive index decreases through the progressive intermediate vision portion of gradient refractive index lens section B from the distance vision portion to the near vision portion, therefore providing progressively increasing power for intermediate and near vision.

Separately, FIG. 10a shows an exemplary lens wherein the internal interface curvature R2 is concave, FIG. 10b shows an exemplary lens wherein the internal interface curvature is plano, and FIG. 10c shows an exemplary lens wherein the internal interface curvature is convex. Posterior lens layer B in FIGS. 10a-c is comprised of an optically transparent material having variable refractive index values. B1 corresponds to the distance vision portion of the lens, B2 corresponds to the progressive intermediate vision portion of the lens, And B3 corresponds to the near vision portion of the lens. The progressive intermediate vision portion B2 is located between dotted lines 2 and 3 of the lens. Line 2 designates the lower aspect of the distance vision portion B1, whose refractive index is N1; line 3 designates the upper aspect of the near vision portion B3, whose refractive index is N3, respectively. The refractive index N2 of the progressive intermediate vision portion B2 decreases from a higher refractive index value equal to that of N1 of portion B1 adjacent B2 to a lower refractive index value equal to that of N3 of portion B3 adjacent B2, the gradient profile following a rate of change which is regular and continuous. Anterior lens section A is comprised of an optically transparent material whose refractive index N4 is generally constant. Anterior surface 4 of lens section A has a curvature with a radius value R1, internal interface I has a curvature R2, and posterior surface 5 of lens section B has a curvature with a radius value R3. The refractive index orientation angle of 8° as shown indicated by dotted lines 2 and 3 is obtained in FIG. 10b by tilting the lens with respect to the angle of gaze of the patient. The lens of FIG. 10c has a combined 4° forward pitch of the lens and 4° tilt of the refractive index medium within the lens, thereby providing a total 8° orientation angle slope. Both lenses have a progressive intermediate vision extent of 8 mm.

Relational values for R1, R2 and R3, representing example lenses illustratively depicted in FIGS. 10a, 10b and 10c, are listed below along with refractive index values. The lens examples provide '0' power in the distance vision portion and 2.5 diopters of add power in the near vision portion of the lens.

|      | Example #1   | Example #2   | Example #3   |
|------|--------------|--------------|--------------|
| N1 = | 1.72         | 1.72         | 1.72         |
| N2 = | 1.72 to 1.44 | 1.72 to 1.44 | 1.72 to 1.44 |
| N3 = | 1.44         | 1.44         | 1.44         |
| N4 = | 1.70         | 1.70         | 1.70         |
| R1 = | 89.637       | 108.921      | 237.809      |
| R2 = | −500.0       | plano        | 200          |

-continued

|  | Example #1 | Example #2 | Example #3 |
|---|---|---|---|
| R3 = | −90.472 | −110.773 | −251.872 |
| CC = | 1.749(p) | 4.270(p) | 79.96(p) |
| OA = | 8° | 8° | 8° |
| IE = | 8 | 8 | 8 |
| CT = | 2.996 | 2.977 | 2.959 |
| ET = | 2.965 | 2.931 | 2.891 |
| CREN = | 18.209 | 18.208 | 18.175 |

Figure 11A:
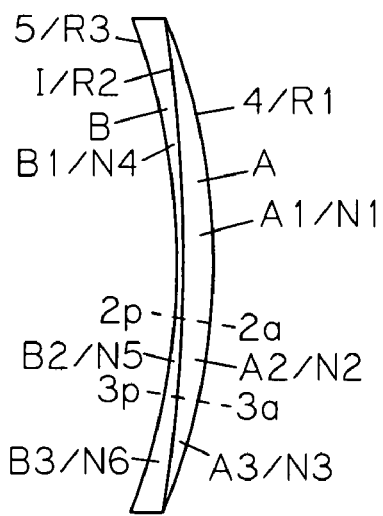
FIGS. 11a and 11b illustratively show side views of a fifth group of gradient index progressive lenses incorporating two refractive index gradient layers in a doublet lens configuration comprising plus and minus power layers in both anterior and posterior positions.
Figure 11B:
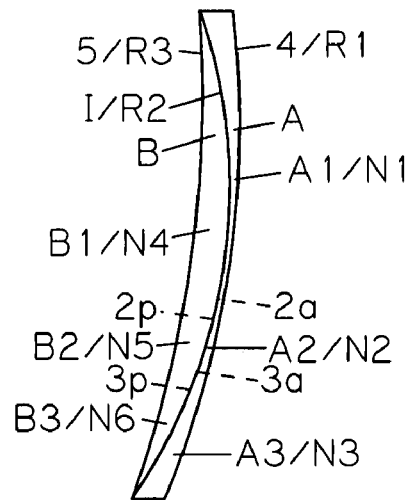

FIGS. 11a and 11b show two doublet lens configurations defining fifth and sixth exemplary lenses made following the teachings of this disclosure. In these examples only one figure each, rather than three, will be used to illustrate the range of forms possible for each, it having been established through previous embodiments and examples that lenses with concave, plano and convex internal interface surfaces can be made following this disclosure's teachings. Collectively, both anterior lens section A and posterior lens section B comprise gradient refractive index portions of the lens. By using a paired set of reverse gradient refractive index layers in adjacent plus power and minus power sections the refractive index difference (RID) of each layer may be additively combined, resulting in a RID value well beyond what may be achieved by a single gradient refractive index layer, thereby providing a means of achieving high add values with lower or flatter curvatures and reducing lens thickness, as will be seen in the following embodiments and examples.

In the example shown in FIG. 11a, lens section A has plus power and lens section B has minus power. The refractive index of anterior lens section A increases through its progressive intermediate vision portion from the distance vision portion to the near vision portion, and the refractive index of posterior lens section B decreases through its progressive intermediate vision portion from the distance vision portion to the near vision portion this arrangement provides progressively increasing power for intermediate and near vision. Lens layer A is comprised of an optically transparent material having variable refractive index values. A1 corresponds to the distance vision portion of the lens, A2 corresponds to the progressive intermediate vision portion of the lens, and A3 corresponds to the near vision portion of the lens.

The progressive intermediate vision portion A2 is located between dotted lines 2a and 3a of the lens. Line 2a designates the lower aspect of the distance vision portion A1, whose refractive index is N1, and line 3a designates the upper aspect of the near vision portion A3, whose refractive index is N3. The refractive index N2 of the progressive intermediate vision portion A2 increases from a lower refractive index value equal to that of N1 of portion A1 adjacent A2 to a higher refractive index value equal to that of N3 of portion A3 adjacent A2, the gradient profile following a rate of change which is regular and continuous. Lens layer B is comprised of an optically transparent material having variable refractive index values. B1 corresponds to the distance vision portion of the lens, B2 corresponds to the progressive intermediate vision portion of the lens. and B3 corresponds to the near vision portion of the lens.

The progressive intermediate vision portion B2 is located between dotted lines 2p and 3p of the lens, which designate the lower aspect of the distance vision portion B1, whose refractive index is N4, and the upper aspect of the near vision portion B3, whose refractive index is N6, respectively. The refractive index N5 of the progressive intermediate vision portion B2 decreases from a higher refractive index value equal to that of N4 of portion B1 adjacent B2 to a lower refractive index value equal to that of N6 of portion B3 adjacent B2, the gradient profile following a rate of change which is regular and continuous.

In the Figure dotted lines 2a and 3a and 2p and 3p representing respectively refractive index gradient portions of lens sections A and B are aligned to provide cooperating and aligned vision portions of the lens. By alignment is meant that the refractive index gradients share a common level and extent. It also means that the surfaces defining the orientation angles of the upper and lower aspects of the two refractive index gradients generally coincide. The refractive index gradient orientation angle of the example lenses is 8°, produced by tilting the refractive index mediums within the body of the lens, and the extent of the progressive intermediate vision portions is 14 mm. Anterior surface 4 of lens section A has a curvature with a radius value R1, internal interface I has a curvature R2, and posterior surface 5 of lens section B has a curvature with a radius value R3. Relational values for R1, R2 and R3, representing example lenses with concave, plano and convex internal interface curvatures are listed below along with the associated CREN values, refractive indices, lens thicknesses and optional conic constant values. The three lens examples provide '0' power in the distance vision portion and 2.5 diopters of add power in the near vision portion of the lens.

|  | Example #1 | Example #2 | Example #3 |
|---|---|---|---|
| N1 = | 1.44 | 1.44 | 1.44 |
| N2 = | 1.44 to 1.70 | 1.44 to 1.70 | 1.44 to 1.70 |
| N3 = | 1.70 | 1.70 | 1.70 |
| N4 = | 1.70 | 1.70 | 1.70 |
| N5 = | 1.70 to 1.44 | 1.70 to 1.44 | 1.70 to 1.44 |
| N6 = | 1.44 | 1.44 | 1.44 |
| R1 = | 92.184 | 169.531 | 293.392 |
| R2 = | −200.0 | plano | 400.00 |
| R3 = | −114.624 | −268.752 | −821.066 |
| CC = | −.605(a) | −10.031(a) | −75.316(a) |
| OA = | 8° | 8° | 8° |
| IE = | 14 | 14 | 14 |
| CT = | 2.034 | 2.007 | 2.004 |
| ET = | 1.395 | 1.374 | 1.371 |
| CREN = | 9.573 | 9.619 | 9.626 |

Three additional lens examples shown below provide '0' power in the distance vision portion and 3.5 diopters of add power in the near vision portion of the lens.

|  | Example #1 | Example #2 | Example #3 |
|---|---|---|---|
| N1 = | 1.42 | 1.42 | 1.42 |
| N2 = | 1.42 to 1.74 | 1.42 to 1.74 | 1.42 to 1.74 |
| N3 = | .74 | 1.74 | 1.74 |
| N4 = | 1.74 | 1.74 | 1.74 |
| N5 = | 1.74 to 1.42 | 1.74 to 1.42 | 1.74 to 1.42 |
| N6 = | 1.42 | 1.42 | 1.42 |
| R1 = | 84.012 | 143.482 | 223.017 |
| R2 = | −200.0 | plano | 400.00 |
| R3 = | −111.396 | −251.616 | −679.771 |
| CC = | −.417(a) | −6.746(a) | −37.295(a) |
| OA = | 8° | 8° | 8° |
| IE = | 14 | 14 | 14 |
| CT = | 2.356 | 2.321 | 2.316 |
| ET = | 1.471 | 1.447 | 1.444 |
| CREN = | 10.880 | 10.944 | 10.955 |

Referring to FIG. 11b, section A has minus and section B has plus power. The refractive index of anterior lens section A decreases through its progressive intermediate vision portion from the distance vision portion to the near vision portion, and the refractive index of posterior lens section B increases through its progressive intermediate vision portion from the distance vision portion to the near vision portion. This arrangement provides progressively increasing power for intermediate and near vision. Lens layer A is comprised of an optically transparent material having variable refractive index values. A1 corresponds to the distance vision portion of the lens, A2 corresponds to the progressive intermediate vision portion of the lens, and A3 corresponds to the near vision portion of the lens. The progressive intermediate vision portion A2 is located between dotted lines 2a and 3a of the lens. Line 2a designates the lower aspect of the distance vision portion A1, whose refractive index is N1, and line 3a designates the upper aspect of the near vision portion A3, whose refractive index is N3. The refractive index N2 of the progressive intermediate vision portion A2 decreases from a higher refractive index value equal to that of N1 of portion A1 adjacent A2 to a lower refractive index value equal to that of N3 of portion A3 adjacent A2, the gradient profile following a rate of change which is regular and continuous.

Lens layer B in FIG. 11b is comprised of an optically transparent material having variable refractive index values. B1 corresponds to the distance vision portion of the lens, B2 corresponds to the progressive intermediate vision portion of the lens and B3 corresponds to the near vision portion of the lens. The progressive intermediate vision portion B2 is located between dotted lines 2p and 3p of the lens. Line 2p designates the lower aspect of the distance vision portion B1, whose refractive index is N4, and line 3p designates the upper aspect of the near vision portion B3, whose refractive index is N6. The refractive index N5 of the progressive intermediate vision portion B2 increases from a lower refractive index value equal to that of N4 of portion B1 adjacent B2 to a higher refractive index value equal to that of N6 of portion B3 adjacent B2, the gradient profile following a rate of change which is regular and continuous.

In FIG. 11b dotted lines 2a and 3a and 2p and 3p representing, respectively, refractive index gradient portions of lens sections A and B are misaligned to provide a modified rate of change of power of the lens. By misalignment is meant the refractive index gradients do not share a either a common level or extent, or both. It also means that the planes defining the orientation angles of the upper and lower aspects of the two refractive index gradients do not coincide. Refractive index gradients of adjacent lens sections may be misaligned such that one refractive index gradient is displaced either above or below the level of the refractive index gradient of the adjacent section. In FIG. 11b the refractive index gradient defined by dotted lines 2p and 3p of lens section B is displaced below the refractive index gradient defined by dotted lines 2a and 3a of lens section A by 3 mm, thereby providing a reduced rate of refractive index change at the frontiers of the gradient index portions, resulting in a more gradual power transition at the extremes of the progressive intermediate vision portion.

The orientation angle for each refractive index gradient of the example lenses is 8°, produced by a forward pitch of the lens as previously described, and the extent of each progressive intermediate vision portions is 10 mm. Anterior surface 4 of lens section A has a curvature with a radius value R1, internal interface I has a curvature R2, and posterior surface 5 of lens section B has a curvature with a radius value R3. Relational values for R1, R2 and R3, representing example lenses with concave, plano and convex internal interface curvatures are listed below along with the associated CREN values, refractive indices, lens thicknesses and optional conic constant values. The three lens examples provide '0' power in the distance vision portion and 3.0 diopters of add power in the near vision portion of the lens.

|  | Example #1 | Example #2 | Example #3 |
|---|---|---|---|
| N1 = | 1.74 | 1.74 | 1.74 |
| N2 = | 1.74 to 1.42 | 1.74 to 1.42 | 1.74 to 1.42 |
| N3 = | 1.42 | 1.42 | 1.42 |
| N4 = | 1.42 | 1.42 | 1.42 |
| N5 = | 1.42 to 1.74 | 1.42 to 1.74 | 1.42 to 1.74 |
| N6 = | 1.74 | 1.74 | 1.74 |
| R1 = | 305.623 | 175.404 | 91.656 |
| R2 = | −150 | −110.0 | −70.0 |
| R3 = | −1453.788 | −319.516 | −119.057 |
| CC = | −139.810(a) | −16.698(a) | −.5941(a) |
| OA = | 8 | 8 | 8 |
| IE = | 10 | 10 | 10 |
| CT = | 2.034 | 2.047 | 2.099 |
| ET = | 1.289 | 1.300 | 1.345 |
| CREN = | 9.373 | 9.351 | 9.262 |

Figure 12A:
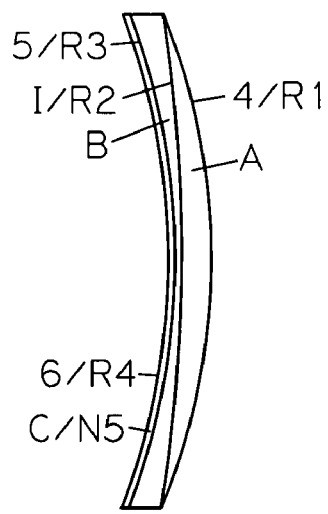
FIGS. 12a and 12b illustratively show side views of a sixth group of gradient index progressive lenses incorporating two refractive index gradient layers in a triplet lens configuration comprising plus and minus power layers in both anterior and posterior positions and a third layer having a surface on which to incorporate a patient's prescription in both anterior and posterior positions.
Figure 12B:
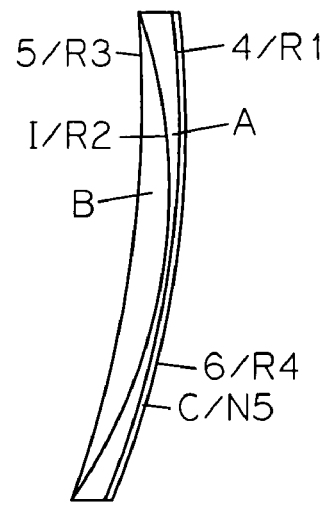

FIGS. 12a and 12b show two triplet lens configurations defining sixth and seventh exemplary lenses constructed following the teachings of this disclosure. Again in these examples only one figure each, rather than three, will be used to illustrate the range of forms possible for each. The lenses have the same defining characteristics and identified refractive index sections N1, N2, N3, N4, N5 and N6 of the prior fifth and sixth examples of FIG. 11a and 11b respectively, wherein both anterior lens section A and posterior lens section B comprise gradient refractive index portions of the lens. Additionally the lens examples in FIGS. 12a and 12b incorporate a third bonded lens layer C on which to provide a patient's prescription. Collectively, posterior lens section C comprises an optically transparent material whose refractive index N7 is generally.

In FIG. 12a, lens section C is positioned adjacent lens section B and is therefore the posterior-most layer of the lens. In FIG. 12b, lens section C is positioned adjacent lens section A, and is therefore the anterior-most layer of the lens. In both embodiments lens section C may be positioned adjacent either lens section A or lens section B. In lens blank form the lens of FIG. 12a may be formed with lens section C thick enough to allow a wide range of patient prescriptions to be processed into the finished lens. Final center thickness of lens section C may be as low as 0.25 mm. Relational values for R1, R2, R3, and R4 for the two embodiments representing example lenses with various internal interface curvatures R2 are listed below along with the associated CREN values, refractive indices, lens thicknesses and optional conic constant values. The equation to determine the CREN number has been modified to include values corresponding to the additional lens layer C, and is expressed in surface diopters as follows:

$$D1 + 2 \cdot D2 + D3 + (D3 - D4) = CREN$$

wherein D1, D3 and D4 are the absolute values of the surface diopters of R1, R3 and R4 respectively, and the sign of D2, which is the surface diopter power of R2, is positive when its curvature is convex with respect to lens section A and negative when its curvature is concave with respect to lens section A. (D3−D4) is an unsigned value.

To provide a lens with minimum bulk or 'gross sag' and maximum CREN efficiency, it is preferable that both lens portions A and B share more or less equally in providing the progressive add power of the lens. It is also possible to slightly increase the CREN and optical performance efficiency of the lens by increasing the thickness of lens section C to a value greater than the 0.25 mm center thickness listed above. By so doing some of the lens curvatures flatten slightly, although overall thickness of the lens is increased, so there is a trade off of sorts. To provide improved optical performance, increase the CREN efficiency and to reduce lens thickness and bulk a center thickness for lens section C may preferably be between 0.25 and 1.0 mm.

With patient prescriptions requiring plus power in the distance portion of the lens, center thickness of lens section C may exceed 1 mm. Conversely, with patient prescriptions requiring minus power in the distance portion of the lens, edge thickness of lens section C and of the entire lens will increase. In the example lenses below, a center thickness of 0.5 mm has been selected for lens section C. Additionally, for convenience and to provide a range of patient prescriptions that will allow a thin lens section C to be utilized, an R4 value for lens section C equal to the R3 value of lens section B, when section C is adjacent section B, and equal to the R1 value of lens section A, when section C is adjacent section A, is used in the examples below. As portions A and B are opposite in both power sign and gradient refractive index profile orientation, the opportunity exists to increase, up to double, the refractive index difference or RID value of the lens by approximately a 50% power sharing of the two portions.

It is possible to shift the function percentage between the portions and still maintain excellent optical quality, but in so doing both gross sag of the lens and the CREN are increased. The percentage shift may favor either lens section A or lens section B. For example, a shift in favor of lens section A would result in an increase in the surface diopter power and center thickness of lens section A and a decrease in the surface power and edge thickness of lens section B. The percentage shift can be partial or even equal 100%, in which case lens section A will be doing all the work, and be quite a bit steeper, and lens section B will essentially become a plano lens, contributing nothing to the add function of the lens. In this case the lens is essentially the same as the lens of the first example wherein there is only one section comprising the gradient refractive index portion of the lens. It should therefore be understood that lenses of the sixth and seventh exemplary lenses may have CREN numbers ranging from a maximum efficiency value, resulting from the optimal sharing and combining of both add generating lens portions A and B, to approximately that of a lens with only one section incorporating a gradient refractive index. In the example lens parameters of 12a below, the CREN value in parenthesis represents the CREN value when section A is providing 100% of the add power and section B provides none, and in the example lenses of 12b, the CREN value in parenthesis represents the CREN value when section B is providing 100% of the add power and section A provides none. The CREN value for each lens example may range between these two values based on the percentage each portion contributes to the add power of the lens. Orientation angle OA and progressive intermediate portion extent IE are the same as in the example lenses of FIGS. 11a and 11b, and are not listed with the example lens parameters below. The lenses provide '0' power in the distance vision portion and 3.5 diopters of add power in the near vision portion of the lens.

| Lens 12a | | | |
|---|---|---|---|
| | Example #1 | Example #2 | Example #3 |
| N1 = | 1.46 | 1.46 | 1.46 |
| N2 = | 1.46 to 1.70 | 1.46 to 1.70 | 1.46 to 1.70 |
| N3 = | 1.70 | 1.70 | 1.70 |
| N4 = | 1.70 | 1.70 | 1.70 |
| N5 = | 1.70 to 1.46 | 1.70 to 1.46 | 1.70 to 1.46 |
| N6 = | 1.46 | 1.46 | 1.46 |
| N7 = | 1.66 | 1.66 | 1.66 |
| R1 = | 89.131 | 114.045 | 262.062 |
| R2 = | −400.00 | plano | 200.00 |
| R3 = | −120.208 | −172.008 | −1247.917 |
| R4 = | −120.208 | −172.008 | −1247.917 |
| CC = | −.122(a) | −.461(a) | −47.467(a) |
| CT = | 3.371 | 3.354 | 3.346 |
| ET = | 2.500 | 2.483 | 2.476 |
| CREN = | 14.538 (to 24.48) | 14.582 (to 24.65) | 14.617 (to 24.84) |

| Lens 12b | | | |
|---|---|---|---|
| | Example #1 | Example #2 | Example #3 |
| N1 = | 1.42 | 1.42 | 1.42 |
| N2 = | 1.42 to 1.74 | 1.42 to 1.74 | 1.42 to 1.74 |
| N3 = | 1.74 | 1.74 | 1.74 |
| N4 = | 1.74 | 1.74 | 1.74 |
| N5 = | 1.74 to 1.42 | 1.74 to 1.42 | 1.74 to 1.42 |
| N6 = | 1.42 | 1.42 | 1.42 |
| N7 = | 1.70 | 1.70 | 1.70 |
| R1 = | 96.833 | 195.042 | 331.492 |
| R2 = | −70.0 | −110 | −143.2176 |
| R3 = | −135.095 | −470.854 | plano |
| R4 = | 96.833 | 195.042 | 331.492 |
| CC = | .45(p) | 77.372(p) | −85.810(a) |
| CT = | 2.894 | 2.838 | 2.825 |
| ET = | 2.022 | 1.968 | 1.955 |
| CREN = | 10.842 (to 17.41) | 10.931 (to 17.54) | 10.948 (to 17.56) |

FIGS. 13 through 18 show an additional exemplary lenses constructed following the teachings of this disclosure. They have multi-layered Fresnel lenses incorporating a gradient refractive index. As previously stated, a Fresnel lens surface comprises numerous discontinuous coaxial annular sections each defining a slope corresponding to a continuous lens surface geometry, collapsed to form a surface of lower profile. Joining each optically functional annular section is a non-optically functional step, also in the form of an annulus, that in conjunction with the refracting surfaces determines the overall geometry and lens thickness.

Fresnel lenses typically are not used in ophthalmic lens applications as the imaging quality of such lenses is generally considered poor. Not only is there image jump if the lens surface is not produced to exceedingly high levels of accuracy, but also the efficiency of the lens is poor especially for increasing angles of gaze or obliquity or light rays. Poor efficiency results when light rays that otherwise would enter the eye are obstructed by the non-optically functional steps whose angular orientation do not correspond to the light ray pathways. The light loss is most pronounced in the periphery of the lens and can affect vision through the upper distance vision, lateral and lower near vision portions of the lens. Furthermore there is light loss due to diffraction, scattering and reflectance from the textured surface, and of course, there is for some the cosmetic concern of wearing lenses that look like transparent Victrola records.

Three steps may be taken to dramatically improve the performance and appearance of a Fresnel lens according to the teaching of this disclosure so that it may be used in an ophthalmic application. First, each annulus comprising a non-optically functional step may be oriented at an angle substantially equal to that of the light rays passing through that point on the lens from points in the field corresponding to the line of sight of the patient and proceeding to the patient's eye. The question arises as to what point should be selected as the exit pupil. There are two primary locations to consider, one being the location of the eye pupil when the patient is looking straight forward through the center of the lens, and the other is the center of rotation of the eye, which is the location that may be considered the "exit" pupil when the patient is looking through the various peripheral portions of the lens. If the location of the eye pupil when the patient is looking straight forward is used to determine the slope of the non-optically functional steps, while it is true that objects seen in the peripheral field will have good contrast and clarity when looking straight forward, when the eye gazes to look at objects through the left, right or lower reading portion of the lens there will be some degradation of peripheral vision resulting from obstruction of light rays by the steps. Conversely, if the center of rotation of the eye is used to determine the slope of the non-optically functional steps, while it is true that objects seen in the patient's peripheral field will have good contrast and clarity when gazing at an angle through the left, right or lower near vision portion of the lens, when the eye looks straight forward to view an object in the central portion of the lens, there will be some degradation of peripheral vision resulting from obstruction of light rays by the steps.

When the patient looks straight ahead, the pupil is located approximately 16 mm behind the back surface of the spectacle lens, whereas the center of rotation of the eye is approximately 28.5 mm behind the back surface of the spectacle lens. Either location, or any point in between may be used to determine the slope angles of the steps and excellent results may be achieved. Furthermore, improved results may be achieved by selecting any point posterior of the lens greater than about 15 mm as the location defining the exit pupil. A distance of 21 mm from the back surface of the lens for the location of the exit pupil results in an approximately equal angular error of the non-optical step of about 8° for the two extremes of the eye orientation stated with reference to peripheral rays directed to that location. The slope of each step may equal the angle of refracted rays passing through the lens at the location of the step and proceeding from the lens to the exit pupil. Each step may be visualized as one of a series of annular right circular concentric conical sections formed by the intersection of conical surfaces and the lens body, as the conical surfaces, following at least to some degree the pathway of the refracted light rays proceeding through the lens, form their apices at the 21 mm distance mentioned or other distances posterior of the back surface of the lens.

The second step that may be taken to improve the Fresnel lens performance of the present invention is to bond the defined adjacent lens layer to the Fresnel surface as a cast layer, thereby limiting or entirely eliminating Fresnel diffraction and reflection of one portion, either the upper distance or lower near vision portion, and substantially reducing diffraction and reflection in the other portion, while providing protection of the vulnerable Fresnel geometry. When the refractive index of the bonded portion is equal to that of the Fresnel preform, the function of the Fresnel as well as its visibility and any resulting visual degradation are completely eliminated. Such an area of the doublet Fresnel lens will act as a single index optical window and is ideal for the distance vision portion of the lens.

Third, by using a high power Fresnel preform of either plus or minus power, for example 20 diopters, the refractive index of the bonded portion providing progressive add power may be somewhat close to that of the preform. The higher the power, the less refractive index difference there need be. The refractive index of the bonded add portion may be greater or lesser than that of the preform, yielding a plus or minus power, depending on whether the Fresnel preform is positive or negative in power. The use of a high power Fresnel preform with a bonded add portion comprising a refractive index somewhat close to that of the Fresnel perform provides an advantage in that diffraction, light scattering, reflectance, surface geometry and any surface error or damage may be visibly reduced.

Figures 13, 14:
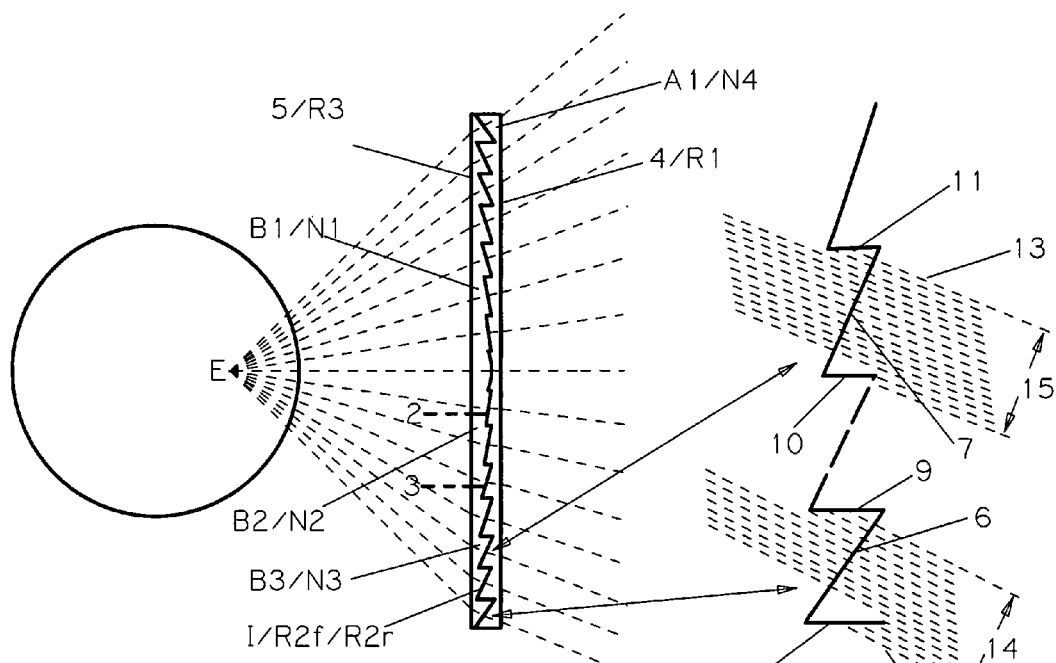
FIG. 13 is an illustrative side view of a gradient index progressive lens incorporating a refractive index gradient in the form of a doublet Fresnel lens.
FIG. 14 illustrates the light pathways through a peripheral region of the Fresnel lens of FIG. 13.

FIG. 13 shows a doublet fresnel lens configuration defining an eighth exemplary lens constructed following the teachings of this disclosure. In the FIG. 13 lens, the non-optically functional steps are normal to the form of the lens, and do not correspond to the described exit pupil. In the figure, lens section A comprises the generally constant refractive index section of the lens, and lens section B comprises the gradient refractive index section of the lens. Separately, section A has minus power and section B has plus power. In this exemplary lens the refractive index increases through the progressive intermediate vision portion of gradient lens section B from the distance vision portion to the near vision portion, therefore providing progressively increasing power for intermediate and near vision.

There is no refractive index orientation angle as the thickness of lens section B is minimal and therefore the thickness of the refractive index gradient located between dotted lines 2 and 3 is also minimal, on the order of 0.4 mm. Furthermore, as the curvature, or maybe more appropriately stated, the 'form' of the Fresnel surface is independent of the power of the Fresnel lens, CREN values will be low or zero unless the air boundary surfaces depart significantly from the diopter curvature form or shape of the frensel, or if there isn't cancellation of one of the Fresnel surfaces areas by an adjacent layer portion with an identical refractive index. In these cases plus or minus power supplied by one or both of the air boundary surfaces will be required to correct the lens to the '0' power for distance standard. For Fresnel lenses of the present example the CREN equation is modified to the following:

$$1000/R1 - 2 \cdot 1000/(R2 + 1000/R3 = CREN$$

wherein R1, R2 and R3 are the absolute values of the surface radii, and R2 is the diopter curvature form (R2*f*) of the Fresnel, independent of its actual surface power.

For a lens in which the refractive index of one layer portion of a gradient refractive index section, for example the distance vision portion, is identical to the Fresnel preform it is bonded to, no corrective curvatures will be required on R1 and R3, and as such they may 'parallel' the contour or form of R2, whether R2 is flat or curved. In this case the CREN value ends up at '0', as shown in the substituted equation when R1, R3 and R2 are 250 mm.

$$4 - 8 + 4 = 0$$

When R1 and R3 do not parallel R2, for example when R2 is flat and R1 is 333 mm and R3 is −333 mm, the CREN value is 6, indicating some bulk or gross sag to the lens. CREN values for the Fresnel lens of the present example generally range from 0 to 20, and are listed with the associated lens parameters for each example Fresnel lens.

In FIG. 13, posterior lens layer B is comprised of an optically transparent material having variable refractive index values. B1 corresponds to the distance vision portion of the lens, B2 corresponds to the progressive intermediate vision portion of the lens and B3 corresponds to the near vision portion of the lens. The progressive intermediate vision portion B2 is located between dotted lines 2 and 3 of the lens, which designate the lower aspect of the distance vision portion B1, whose refractive index is N1, and the upper aspect of the near vision portion B3, whose refractive index is N3, respectively. The refractive index N2 of the progressive intermediate vision portion B2 increases from a lower refractive index value equal to that of N1 of portion B1 adjacent B2 to a higher refractive index value equal to that of N3 of portion B3 adjacent B2, the gradient profile following a rate of change which is regular and continuous. Anterior lens layer A is a Fresnel perform lens comprised of an optically transparent material whose refractive index N4 is generally constant and which does not vary. Anterior surface 4 of lens layer A has a curvature R1 which is plano, internal Fresnel interface I has a form R2f, which is generally flat, an equivalent Fresnel radius R2r with respect to lens section A and a conic constant value CC, and posterior surface 5 of lens section B has a curvature R3 which is plano.

The lens provides '0' power in the distance vision portion and a high diopter add power in the near vision portion of the lens, listed below. Surface 4 may be modified to incorporate a patient's prescription or both surfaces 4 and 5 may be modified to provide a meniscus curvature form. Values for four example lenses are as follows:

|       | Example #1   | Example #2   | Example #3   | Example #4   |
|-------|--------------|--------------|--------------|--------------|
| N1 =  | 1.491        | 1.498        | 1.498        | 1.498        |
| N2 =  | 1.491 to 1.58| 1.498 to 1.58| 1.498 to 1.56| 1.498 to 1.55|
| N3 =  | 1.58         | 1.58         | 1.56         | 1.55         |
| N4 =  | 1.491        | 1.498        | 1.498        | 1.498        |
| R1 =  | plano        | plano        | plano        | plano        |
| R2f = | flat         | flat         | flat         | flat         |
| R2r = | −24.68       | −24.68       | −24.68       | −24.68       |
| CC =  | −.631        | −.631        | −.631        | −.631        |
| IE =  | 12           | 12           | 12           | 12           |
| R3 =  | plano        | plano        | plano        | plano        |
| CT =  | 2            | 2            | 2            | 2            |
| ET =  | 2            | 2            | 2            | 2            |
| CREN =| 0            | 0            | 0            | 0            |
| Add = | 3.5 diopters | 3.265        | 2.455        | 2.05         |

For the above Fresnel lens examples point E, located approximately 21 mm behind lens surface 5, has been selected as the exit pupil, and even though the Fresnel geometry is not corrected by a corresponding angling of the Fresnel steps, this point still is a valid reference for determining the efficiency of an uncorrected geometry Fresnel.

FIG. 14 is an enlargement of two optically functional slopes 6 and 7 along with interconnecting non-optically functional steps 8, 9 and 10, 11. of internal Fresnel interface R2r of FIG. 13, indicated by the arrows. Light rays bundles 12 and 13, shown at predetermined diameters 14 and 15 respectively, both proceed through the lens and are refracted to the exit pupil E, hence the two slightly different angles. As can be seen from the illustration, a significant amount of the bundles 12 and 13 is clipped or obstructed by steps 8, 9 and 10, 11 and as a result the lens is quite inefficient in its periphery.

Lens example #1 in FIG. 14 comprises a Fresnel preform A with a negative focal length of 50 mm, refractive index N4 of 1.491, Fresnel radius R2r of −24.68 mm, and conic constant of −0.631. This preform is combined with a 0.4 mm thick cast Fresnel layer B comprising an N1 refractive index of 1.491, an N2 gradient refractive index ranging from 1.491 to 1.58 and an N3 refractive index of 1.58. The lens provides 3.5 diopters of progressive add power. Two rays are selected at peripheral angles of 35° and 45° degrees directed to the above described exit pupil. At the location the refracted 45° ray bundle passes through a single internal Fresnel interface annulus, the surface slope is 44.67° and has a calculated step depth of 0.25095 mm over a selected groove width of 0.254 mm. At the location the refracted 35° ray bundle passes through the internal Fresnel interface annulus the surface slope is 32.51° and has a calculated step depth of 0.16210 mm over the groove width of 0.254 mm. The 45° ray is refracted from an internal ray angle of 26.59°, and the 35° ray is refracted from an internal ray angle of 21.29°. The 26.59° ray shows losses from interference of the 0.25095 mm tall (outer) step annulus resulting in 49.5% light reduction, and the 35° ray shows losses from interference of the 0.16210 mm tall (outer) step annulus resulting in a 25% light reduction. There will be negligible light loss through the portion where the refractive indices of lens section A and lens section B are the same, that is in this case where both have a refractive index of 1.491, as the surface geometry of the Fresnel interface becomes invisible and ineffective. It is the step angles of the near vision portion, where there is a refractive index difference of 0.089, that should be corrected. Furthermore, to avoid or minimize chromatic aberration optical materials with similar Abbe values should be selected, or materials with compensating Abbe characteristics may be selected to correct chromatic aberration.

Figures 15, 16:
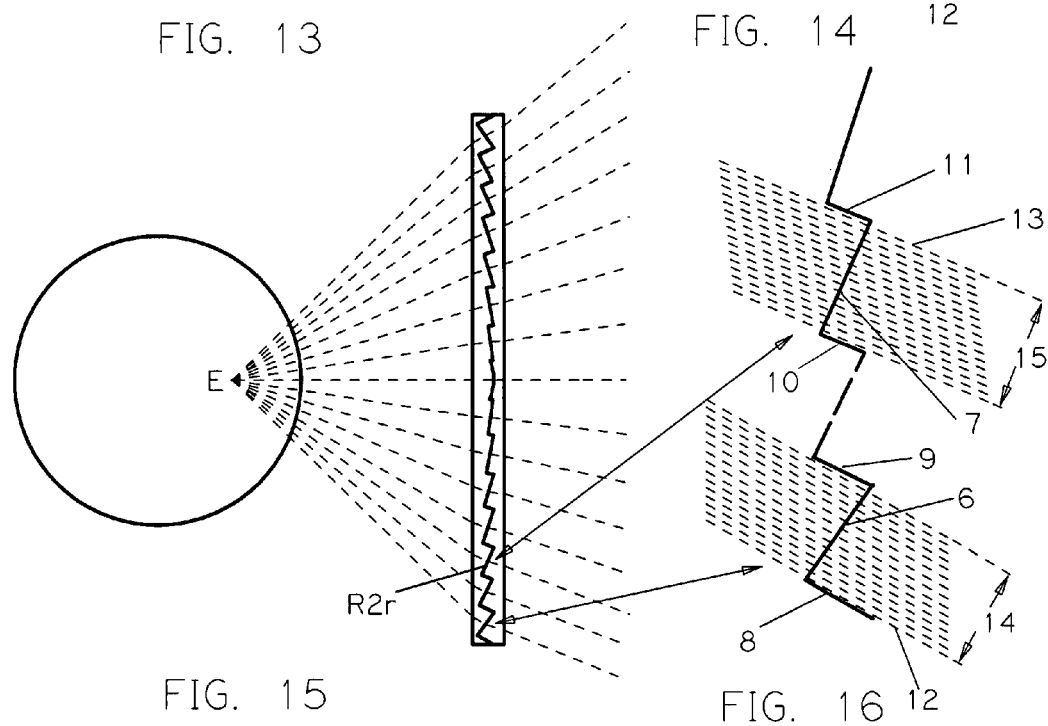
FIG. 15 is an illustrative side view of a gradient index progressive lenses incorporating a refractive index gradient in the form of an optimized doublet Fresnel lens.
FIG. 16 illustrates the light pathways through a peripheral region of the Fresnel lens of FIG. 15.

FIG. 15 shows a doublet Fresnel lens configuration of a ninth lens constructed following the teachings of this disclosure identical to the prior Fresnel lens of FIG. 13 except that the annular step slopes have been corrected as described to minimize obstruction of light rays especially through the periphery of the lens. The surface radii, refractive indices, lens section powers, thickness and add power of the lens are the same as listed for example #1 lens relating to FIG. 13.

FIG. 16 is an enlargement of two optically functional slopes 6 and 7 along with interconnecting non-optically functional steps 8, 9 and 10, 11 of internal Fresnel interface R2r of FIG. 15, indicated by the arrows. Light rays bundles 12 and 13, shown at the same dimensions 14 and 15 as in FIG. 14, both proceed through the lens and are refracted to the exit pupil E. As can be seen from the illustration, there is no clipping or obstruction of the bundles by steps 8, 9 and 10, 11 at the Fresnel interface. As a result there is minimal light loss and the lens is quite efficient in its periphery, providing high contrast, bright and clear visualization of objects in the lateral peripheral field and through the near vision portion of the lens. As mentioned the annular Fresnel steps have been optimized for an exit pupil location E 21 mm behind the back surface of the spectacle lens, thereby resulting in only slight obstruction of light rays for both straight ahead and peripherally directed gazing by the patient.

In the prior Fresnel lens examples the internal Fresnel interface surface I is generally flat as is typical of most commercially available Fresnel lenses, but the form of the lens may be other than flat, for example with surfaces R1 and R3 curved in meniscus form to resemble a standard ophthalmic lens. In this case the lens thickness will increase as a result of increased center thickness of section A and increased edge thickness of section B. By using low diopter curvatures, the thickness increase will be within reasonable limits.

FIG. 17 shows a tenth exemplary lens constructed following the teachings of this disclosure. The FIG. 17 lens is a triplet Fresnel lens incorporating a third bonded lens layer C. In the figure internal Fresnel interface surface I is generally flat and the form of the lens as above described is meniscus and resembles a standard ophthalmic lens. The lens may incorporate non-optically functional steps which are normal to the plane of the lens or which are angled and corrected as described above in connection with FIGS. 15 and 16.

In FIG. 17, lens section A comprises a Fresnel preform of generally constant refractive index, lens section B comprises the gradient refractive index section of the lens, and lens section C comprises a $2^{nd}$ preform. Separately, section A has minus power, section B has plus power, and section C has minus power. In this example the refractive index increases through the progressive intermediate vision portion of gradient lens section B from the distance vision portion to the near vision portion, therefore providing progressively increasing power for intermediate and near vision.

As with the prior Fresnel lens example, there is no refractive index orientation angle as the thickness of lens section B is minimal and therefore the thickness of the refractive index gradient located between dotted lines 2 and 3 is also minimal, on the order of 0.35 mm. Gradient refractive index lens layer B functions as an optical cement between lens layers A and C. B1 corresponds to the distance vision portion of the lens, B2 corresponds to the progressive intermediate vision portion of the lens and B3 corresponds to the near vision portion of the lens. The progressive intermediate vision portion B2 is located between dotted lines 2 and 3 of the lens, which designate the lower aspect of the distance vision portion B1, whose refractive index is N1, and the upper aspect of the near vision portion B3, whose refractive index is N3, respectively. The refractive index N2 of the progressive intermediate vision portion B2 increases from a lower refractive index value equal to that of N1 of portion B1 adjacent B2 to a higher refractive index value equal to that of N3 of portion B3 adjacent B2, the gradient profile following a rate of change which is regular and continuous.

Anterior lens layer A is a Fresnel preform lens comprising an optically transparent material whose refractive index N4 is generally constant. Posterior lens layer C is a preform lens with a refractive index N5. Internal surface 5 of lens section C has a curvature R3 which may be flat or just slightly convex with respect to lens section C in order to facilitate an air bubble free bond in conjunction with the gradient refractive index optical cement comprising section B. Anterior surface 4 of lens layer A has a curvature R1 which is convex, internal Fresnel interface I has a form R2f, which is generally flat, an equivalent Fresnel radius R2r with respect to lens section A and a conic constant value CC, and posterior surface 6 of lens section C has a curvature R4 which is concave. Surface 4 or 6 may be modified to incorporate a patient's prescription. The 3 diopter convex curvature of surface 4 and concave curvature of surface 6 provide a meniscus lens form typical of ophthalmic lenses. Center and edge thicknesses in a 50 mm diameter lens having the following parameters are well within reasonable limits for an ophthalmic lens and are listed below. The lens provides '0' power in the distance vision portion and 3.265 diopters of add power in the near vision portion of the lens. Higher refractive index preforms will result in a significantly thinner lens, allowing for higher curvatures for surfaces 4 and 6.

| | |
|---|---|
| N1 = | 1.498 |
| N2 = | 1.498 to 1.58 |
| N3 = | 1.58 |
| N4 = | 1.498 |
| N5 = | 1.498 |
| R1 = | 333.333 |
| R2f = | flat |
| R2r = | −24.68 |
| CC = | −.631 |
| R3 = | flat |
| R4 = | −332.821 |
| CT = | 1.54 |
| ET = | 1.54 |
| CREN = | 6.005 |

The above Fresnel examples may be produced with either or both sections comprising the gradient refractive index sections of the lens as with previous embodiments of this writing, although it is preferred that only one section comprise a gradient refractive index in the Fresnel lens versions. Additionally, an lens similar to the fifth and sixth exemplary lenses wherein both sections comprise a gradient refractive index, and the progressive intermediate portions are misaligned may provide a modified rate of change of power as desired. The Fresnel preform may have either plus or minus power and be positioned as either the anterior or posterior lens layer. The refractive index of one portion of the gradient refractive index layer may be the same as or different than its counterpart of the adjacent bonded layer. Also as shown, the inner Fresnel surface may typically be flat with the overall form of the lens being either flat or curved.

FIG. 18 shows a doublet fresnel lens configuration of an eleventh exemplary lens constructed following the precepts of this disclosure. The FIG. 18 lens incorporates a curved internal Fresnel surface R2, as well as curved surfaces R1 and R3. In this e ex. the Fresnel lens form incorporates a corrected geometry of the non-optically functional step as previously described in addition to a curved surface R2 that allows a meniscus form to be used without an increased CREN value and added thickness of the lens. In other words the curvature of R2 may approximate that of R1 or R3. R2 in conjunction with R1 and R3 may also provide a more highly curved lens such that the pathways of the light rays within the body of the lens are substantially perpendicular to the Fresnel form and therefore the non-optically functional steps are as well normal to the Fresnel form. The one case in which this occurs is when the radius of posterior surface 5 is approximately equal to the distance to the exit pupil. This translates to a curvature of 47.6 diopters which by most standards would be excessively steep for an ophthalmic lens. Therefore it is preferred that the curvature R2 be reduced to a value typical of base curves of standard ophthalmic lenses, for example 200 mm (5 diopter curve) and the step angles be corrected accordingly. In this example the exit pupil E is located 28.5 mm behind the back surface of the spectacle lens. Section A in FIG. 18 comprises the gradient refractive index section of the lens and section B comprises the generally constant refractive index section of the lens. Separately, section A has minus power and section B has plus power. In this embodiment the refractive index decreases through the progressive intermediate vision portion of gradient index lens section A from the distance vision portion to the near vision portion, therefore providing progressively increasing power for intermediate and near vision.

Lens layer A is comprised of an optically transparent material having variable refractive index values. A1 corresponds to the distance vision portion of the lens, A2 corresponds to the progressive intermediate vision portion of the lens, and A3 corresponds to the near vision portion of the lens. The progressive intermediate vision portion A2 is located between dotted lines 2 and 3 of the lens. Lien 2 designates the lower aspect of the distance vision portion A1, whose refractive index is N1, and line 3 designates the upper aspect of the near vision portion A3, whose refractive index is N3. The refractive index N2 of the progressive intermediate vision portion A2 decreases from a higher refractive index value equal to that of N1 of portion A1 adjacent A2 to a lower refractive index value equal to that of N3 of portion A3 adjacent A2, the gradient profile following a rate of change which is regular and continuous. Posterior lens layer B is a Fresnel preform lens comprised of an optically transparent material whose refractive index N4 is generally constant. Anterior surface 4 of lens layer A has a curvature R1 which is convex, internal Fresnel interface I has a form R2$f$ which is concave and an equivalent Fresnel radius R2$r$ with respect to lens section A and a conic constant value CC, and posterior surface 5 of lens section B has a curvature R3 which is concave. The extent of the progressive intermediate portion IE is 16 mm.

The lens provides '0' power in the distance vision portion and 2.278 diopters of add power in the near vision portion of the lens. Surface 5 may be modified to incorporate a patient's prescription.

Values for an example lens are as follows:

| | |
|---|---|
| N1 = | 1.55 |
| N2 = | 1.55 to 1.498 |
| N3 = | 1.498 |
| N4 = | 1.55 |
| R1 = | 200.0 |
| R2f = | 200.0 |
| R2r = | −22.21 |
| CC = | −.699 |
| R3 = | −199.47 |
| IE = | 16 |
| CT = | 1.5 |
| ET = | 1.5 |
| CREN = | 0.013 |

The gradient refractive index portion of the above described flat-form Fresnel lenses of FIGS. 13, 15 and 17 may be produced using the spraying method previously described, wherein two spray guns moving together in a linear or arcuate path each spray a deposit of one of the refractive index resins onto the Fresnel preform surface in such a manner as to produce an overlapping or common deposit from between 4 to 20 mm wide or greater across the extent of the lens. A thin vertical separator wall positioned between the spray guns and above the pooling resin deposits, oriented in line with the direction of the spray guns' movement, separates the distance and near vision portions and blocks unwanted spray from each gun from depositing in the adjacent portion. The extent of the overlap or blend area may be increased or decreased and easily controlled primarily by adjusting the direction and pattern of spray of the guns and secondarily by adjustment of the height of the separator wall.

Figure 19:
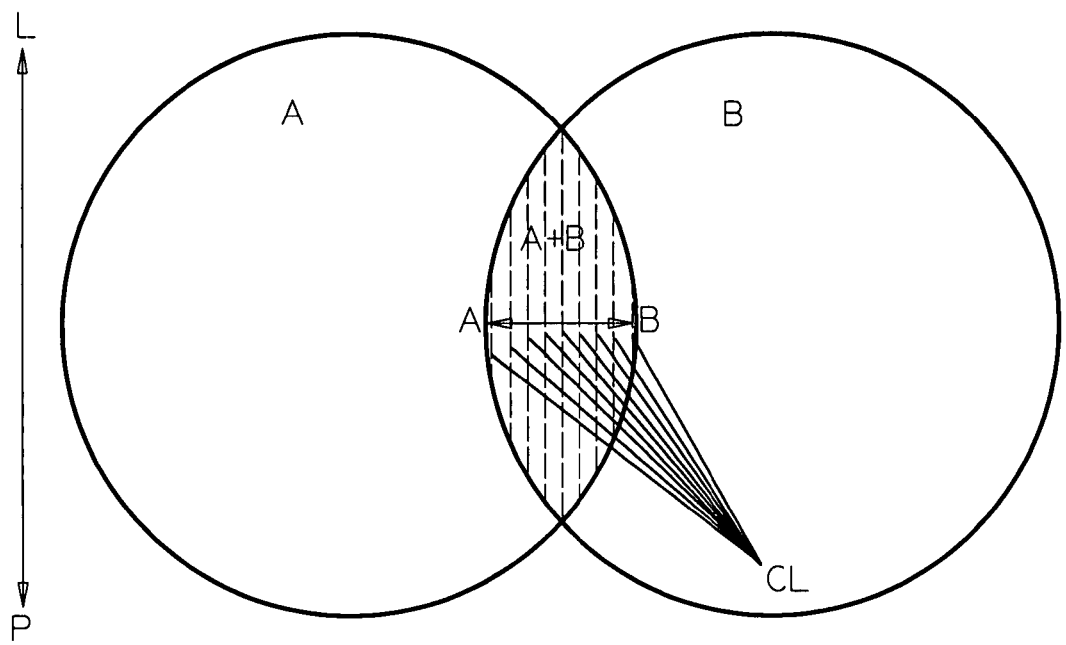
FIG. 19 shows a gradient index section produced by creating a common area of sprayed deposits.

The spray process may continue as the guns continue their back and forth linear or arcuate motion, insuring an even distribution and volume of resin material is deposited over the Fresnel lens surface. The spraying process further insures that thorough mixing of the two resins occurs in the blend area by the massaging and mixing action of the existing pooled deposit caused by the impact of both the resin mist and air pressure of the spray guns. The spraying apparatus described with respect to FIG. 20 may be used to accomplish the above-described spraying procedure. FIG. 19 shows 2 sprayed deposit areas including an overlapping or common area incorporating the gradient index mixture. Both spray pattern deposits in this case are circular, but may be differently shaped, such as elliptical. Circular deposit A and circular deposit B share common area A+B wherein a varying amount of each resin contributes to the composition over the common area extent represented by line AB. Due to the linear or arcuate motion and path of the guns in the direction LP, as well as the varying chord lengths CL of each circular deposit within A+B (parallel to LP), the resin mixture and therefore the refractive index of the composition will demonstrate a smooth, continuous and regular rate of change in a direction perpendicular to LP, closely following the progression of a portion of a sine wave form from its $\pi/2$ to $3\pi/2$ positions.

Once a depth of sprayed deposit is achieved somewhat above the level of the filled voids of the Fresnel surface, the lens may be fully cured or polymerized and subsequently machined or processed as desired, or a protective layer or additional section, such as lens section C of FIG. 17 or 18$a$, may be applied to the liquid resin surface and polymerized, creating a permanently bonded layer. Alternatively a removable casting member may be applied to the upper most resin surface followed by polymerization and subsequent removal to create an optical quality surface such as 5 indicated in FIG. 13. The gradient refractive index portion of the above described curved form Fresnel lens of FIG. 18 may be produced in a similar manner using a two gun spraying system producing a composite refractive index gradient area. In this case the sprays are deposited on a flat surface with flexural characteristics to the desired thickness, for example 0.35 mm thick. Once deposited the resins may be partially polymerized to a gel state. Following this stage the flexible surface may be deformed or relaxed to a curvature corresponding to the Fresnel preform and subsequently pressed against the perform and polymerized to permanently bond the gelled layer to the Fresnel surface. Layer C incorporating the flexible surface may remain as part of the lens, as shown in FIG. 18$a$, or be removed and reused or disposed of. The flexible surface as stated may be relaxed to the desired curvature or by mechanical or other means, for example by a vacuum forming process, be caused to deform to the desired curvature.

Figure 20:
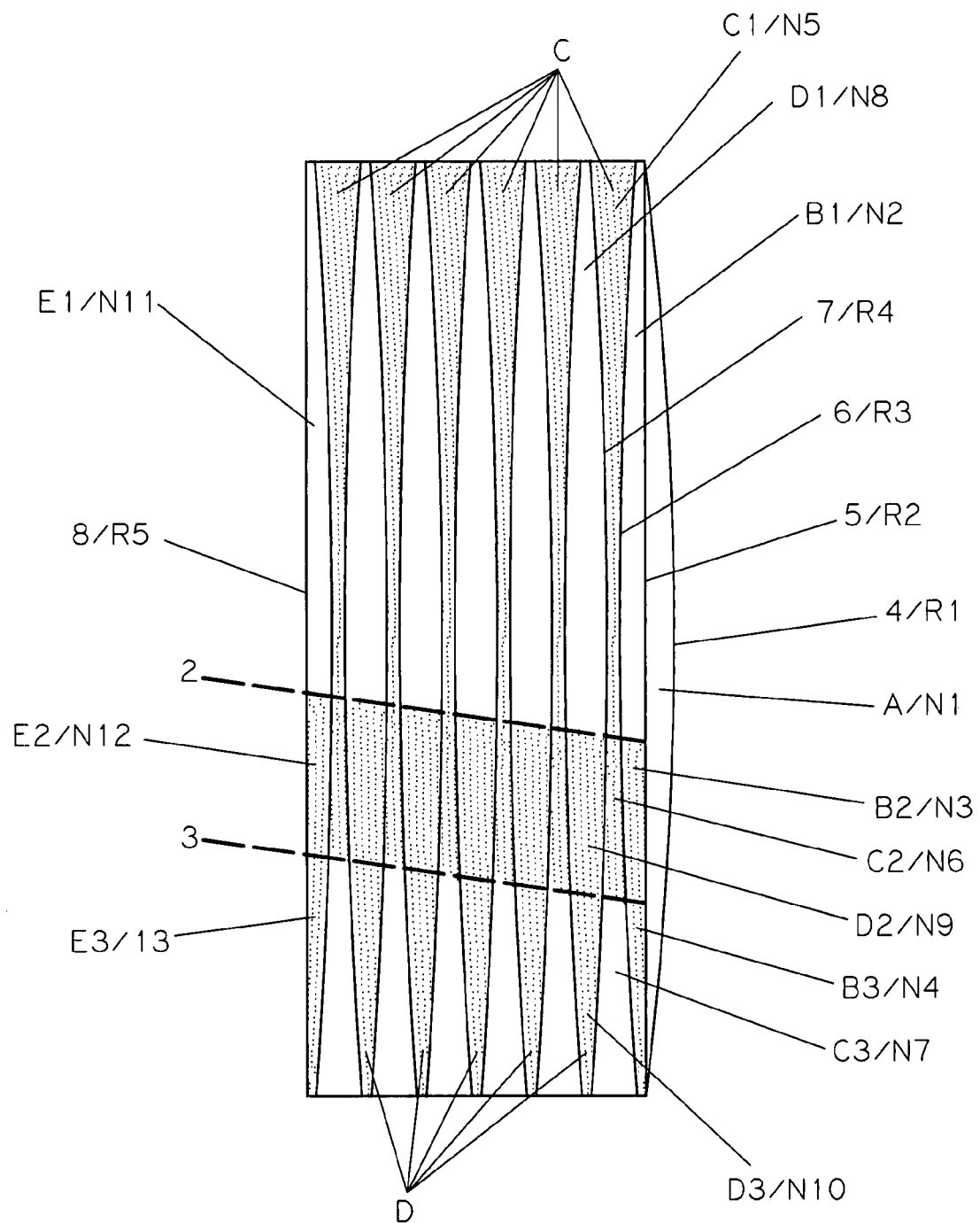
FIG. 20 is an illustrative side view of a 14 layer gradient index progressive lens incorporating numerous refractive index gradient layers.

FIG. 20 shows a 12th exemplary lens constructed following the precepts of this disclosure. The FIG. 20 lens is a gradient index progressive lens which incorporates numerous layers with gradient refractive index profiles and power signs each opposite that of adjacent layers. As already demonstrated, a pair of gradient refractive index profiles may be used in adjacent plus power and minus power layers effectively to increase or double the refractive index difference, thereby providing a means of achieving high progressive add values with lower or flatter curvatures and reduced lens thickness. The present embodiment works on the same principle but utilizes numerous paired layers of low curvature and thickness to achieve a similar result. Film layers 0.3 mm thick or less may be combined in various numbers to produce a corresponding progressive add value. For example, if one pair of oppositely powered and oppositely gradient index-profiled layers provides 0.417 diopters of add, 6 identical paired layers will provide 2.5 diopters of add. In the figure, anterior lens section A comprises a generally constant refractive index layer and sections B, C, D and E comprise gradient refractive index layers of the lens. There are six C sections and five D sections. Sections B and E are equal in power and added together constitute an additional D section. Paired sections C and D are opposite and equal in power. Section A has plus power and compensates for a negative 'add' power of the upper distance vision portion of the lens, section B has plus power, sections C have minus power, sections D have plus power and section E has plus power. In this exemplary lens the refractive index decreases through the progressive intermediate vision portion of gradient refractive index lens section C from the distance vision portion to the near vision portion, and increases through the progressive intermediate vision portion of gradient refractive index lens section D from the distance vision portion to the near vision portion, therefore providing complexed and progressively increasing power for intermediate and near vision.

Lens layer A is comprised of an optically transparent material whose refractive index N1 is generally constant. Lens layer B is comprised of an optically transparent material having variable refractive index values. B1 corresponds to the distance vision portion of the lens and has a refractive index value N2, B2 corresponds to the progressive intermediate vision portion and has a gradient refractive index value N3, and B3 corresponds to the near vision portion of the lens and has a refractive index value N4. Lens layer C is comprised of an optically transparent material having variable refractive index values. C1 corresponds to the distance vision portion of the lens and has a refractive index value N5, C2 corresponds to the progressive intermediate vision portion and has a gradient refractive index value N6, and C3 corresponds to the near vision portion of the lens and has a refractive index value N7. Lens layer D is comprised of an optically transparent material having variable refractive index values. D1 corresponds to the distance vision portion of the lens and has a refractive index value N8, D2 corresponds to the progressive intermediate vision portion and has a gradient refractive index value N9 and D3 corresponds to the near vision portion of the lens and has a refractive index value N10. Lens layer E is comprised of an optically transparent material having variable refractive index values. E1 corresponds to the distance vision portion of the lens and has a refractive index value N11, E2 corresponds to the progressive intermediate vision portion and has a gradient refractive index value N12, and E3 corresponds to the near vision portion of the lens and has a refractive index value N13. Refractive index gradient portions N3, N6, N9 and N12 are located between dotted lines 2 and 3 defining the progressive intermediate vision portion of the lens.

Anterior surface 4 of lens layer A has a convex curvature with a radius value R1, internal interface surface 5 has a radius R2, internal interface surfaces 6 have a radius R3, internal interface surfaces 7 have a radius R4, and posterior surface 8 has a radius R5. Lens sections C and D share curved interfaces 6/R3 and 7/R4. R3 is concave and R4 is convex with respect to section A. Because adjacent internal interface surfaces are opposite in curvature the CREN value for a lens according to this example may be calculated simply by adding the absolute surface diopter powers of all surfaces. The refractive index orientation angle of 8° as shown is obtained by misaligning each successive refractive index gradient an incremental amount. As with the prior example, values for all the radii are based on the lens providing 0 power in the distance vision portion and 2.5 diopters of add power in the near vision portion of the lens.

Exemplary Values for the parameters of a gradient index progressive lens according to this embodiment are as follows:

| | |
|---|---|
| N1 = | 1.74 |
| N2 = | 1.41 |
| N3 = | 1.41 to 1.74 |
| N4 = | 1.74 |
| N5 = | 1.74 |
| N6 = | 1.74 to 1.41 |
| N7 = | 1.41 |
| N8 = | 1.41 |
| N9 = | 1.41 to 1.74 |
| N10 = | 1.74 |
| N11 = | 1.41 |
| N12 = | 1.41 to 1.74 |
| N13 = | 1.7 |
| R1 = | 596.0 |
| R2 = | plano |
| R3 = | −3208.41 |
| R4 = | 3208.41 |
| R5 = | plano |
| CT = | 2.1 |
| ET = | 1.575 |
| CREN = | 5.418 |
| OA = | 8° |
| IE = | 14 |

The above described lens may be produced by processing each lens layer independently of the others in a sequential order using for example the spraying method above described with respect to the FIGS. 13, 15, 17 and 18 in conjunction with a deformable base with desirable flexural characteristics.

Figure 21:
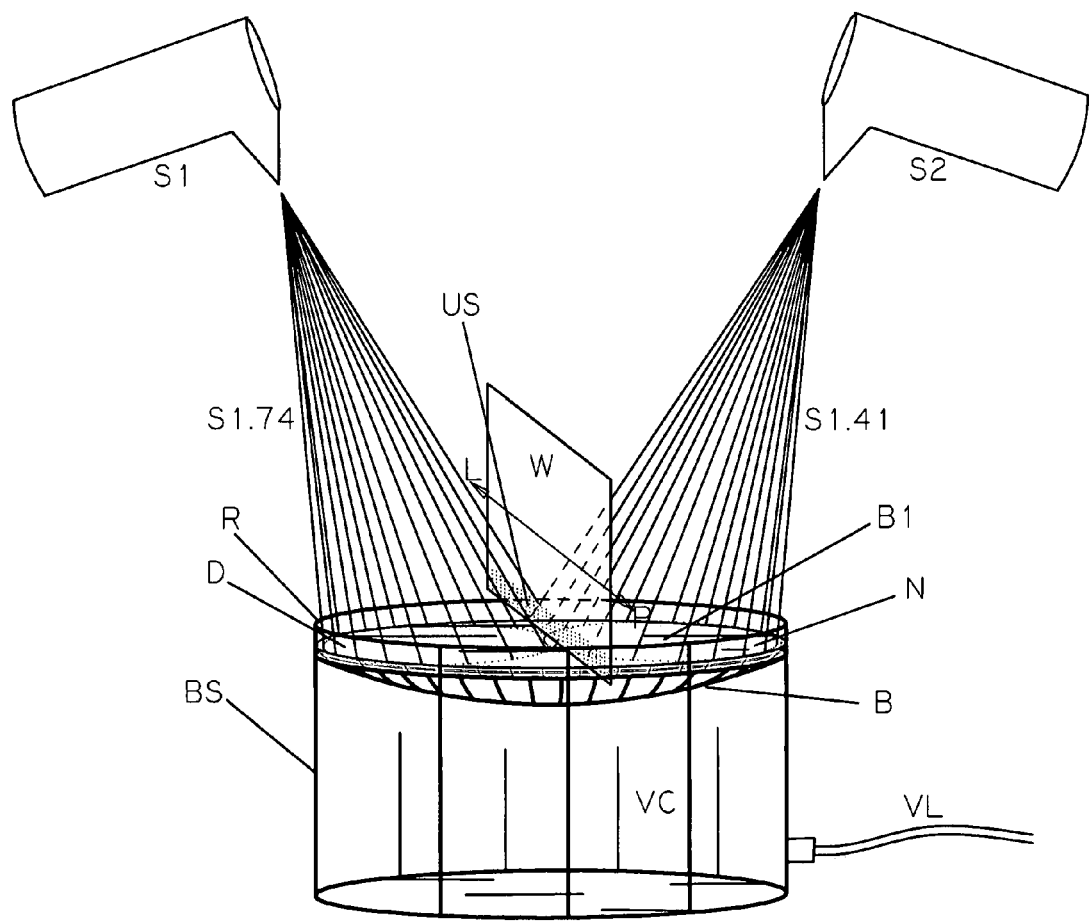
FIG. 21 illustrates an apparatus used to create a gradient index progressive lens layer of gradient refractive index by a spraying technique.

FIG. 21 shows a spraying apparatus that may be used to process the lens layers comprising two spray guns S1 and S2 that deliver separately the 1.74 and the 1.41 refractive index materials respectively. The guns move together in a linear motion and path LP, each spraying resin deposits S1.41 and S1.74 onto base surface B and producing a combined overlapping or common deposit 14 mm wide. A thin vertical separator wall W positioned between the spray guns and above the pooling resin deposits, oriented in line with the direction of the spray guns' movement, divides the distance portion D and near portion N and blocks unwanted spray US from each gun from depositing in the adjacent portion while helping to control the amount of each sprayed resin that passes underneath and beyond it to mix with the adjacent sprayed resin portion. The extent of the common deposit or blend area may be increased or decreased and easily controlled primarily by adjusting the direction and pattern of spray of the guns and secondarily by adjusting the height of the separator wall. Assuming a cone angle spray from each gun of 30°, a convergent tilt of 15° for each gun, a spray distance of 63 mm from gun tip to deposit surface, a gun tip to gun tip separation of 56 mm and separator wall height of 12 mm above the deposit surface, a 14 mm wide gradient index section may be produced. Separator wall W serves mainly to prevent unwanted spray US from depositing but within limits may be adjusted to control the width of the gradient index portion. The wall may include an opening along its lower extent connected to a vacuum source that draws accumulated resin build up away from the sprayed area and off the wall W in order to prevent dripping of material from the wall into the deposit.

Flexible and deformable base B is the surface on which the first resin layer is sprayed, and above which is the vertical separator wall W. The deformable base B is mounted on base support cylinder BS, which has an upper wall portion R that extends above base B and which acts as a container for the sprayed resins. Deformable base B comprises a thin plastic, glass or stainless steel member that through mechanical or other means may be caused to change curvature. During each spray application a change of curvature is induced in base B which in turn creates the curvature of each internal interface as a new layer is applied. In FIG. 21, vacuum line VL provides a partial and controllable vacuum from a vacuum source to vacuum chamber VC and provides suction means to draw deformable base B downward to create a concave curvature. In a following cycle line VL is pressurized to create an atmospheric pressure environment in chamber VC and provides pressure means to push deformable base B upward to create a convex curvature. As R3 and R4 have a sagittal depth of 0.0974 mm over 50 mm, only a small amount of surface change is needed to cause base B to assume the needed radius of curvature. A variable thickness of base B may be used to insure that a surface of continuous and useful optical curvature, for example, a spherical curvature, is achieved when the base is deformed.

The first composite layer B1 is initially applied when the base B is maintained in a flat condition. During the course of spraying as the sprayed layer pools and builds up, base surface B may be progressively steepened in concavity to its final curvature, as indicated in the drawing, as the spray layer thickness is achieved, thus the change of curvature progresses in concert with the build up of the applied resin layer. Once the final curvature is induced and the resin layer thickness is achieved wall W may be removed. At this point the liquid surface of the sprayed resin layer will settle and self-level after which it can be photo polymerized to a gel state. Alternatively, a flat or slightly convex casting surface may be applied to the unpolymerized resin layer to precisely control the surface contour.

A convex casting surface is used to avoid entrapment of air bubbles when applied to the air-exposed surface of the sprayed resin composition. The resin layer may then be gel polymerized and afterward the upper casting surface removed. The top most surface of the gel cured deposit becomes the base B1 on which the second sprayed layer is applied, therefore any minor adjustments in curvature needed may be made to base B to provide a flat surface B1 on which to apply the second layer. A second sprayed resin layer may then be applied to the flat surface, although this time with the spray guns or lens rotated 180° to achieve an opposite refractive index profile orientation. During the course of spraying the second layer, base surface B may be progressively reduced in concave steepness and gradually be made convex to its final steepness as the spray layer thickness is achieved, thus again the change of curvature progresses in concert with the build up of the applied resin layer, creating each new curved interface radius with a corresponding change of curvature of base B. Once the final curvature is induced and the resin layer thickness is achieved, the top surface of the sprayed liquid resin may be finished as previously described. The spray guns or lens may be repeatedly rotated 180° to achieve an opposite refractive index profile orientation for each additional layer having corresponding alternating plus or minus power. Each rotation may also include an incremental offset to achieve the refractive index orientation angle indicated by dotted lines 2 and 3.

It should be noted that after each resin layer is spray deposited and just prior to its gel polymerization, the induced curvature of the prior layer will require a radius of curvature which, once the lens is fully polymerized, becomes alternately the R3 and R4 curvatures. This will require compensatory curvatures to be induced at the gel polymerization stage with minor adjustments made due to lens thickness increase as the layering process ensues. The final polymerization from gel to solid should be undertaken with the base material surface and top surface in a flat state. The final layer A may be produced as a preform and bonded to the composite multi-layered lens, or it may be cast onto surface B or E and polymerized.

As an alternative to the diffusion processes earlier described in relation to the first through seventh lens examples, the above-described spraying technique may also be used. As the thickness of the gradient refractive index section or sections of these lenses will be greater than that of the lens of the twelfth exemplary lens, on the order of 1 mm or greater, a greater sprayed thickness deposit will be required. If the density of the two refractive index materials sprayed is substantially different, the heavier material may settle beneath the lighter material by the pull of gravity if single spray applications of great thickness are applied. To avoid this problem periodic gel polymerization or partial curing of thin applied layers may be undertaken. For example, applied layers 0.25 mm thick may be sequentially gel polymerized until the final layer thickness is achieved. In this case an upper casting surface need not be applied to each of the sequential spray deposits to create a perfectly flat surface as additional spray coatings of the same refractive index profile orientation will be applied. These lenses of greater thickness and steeper curvature may also utilize a deformable base to facilitate the spray production process and to provide the required radius. As previously described, a removable casting surface may be applied to the upper most surface followed by final polymerization and subsequent removal. Alternatively the casting surface may comprise an additional permanently bonded lens section serving as a protective layer.

What is claimed is:

1. A gradient index lens formed of at least two layers, one having a positive power and the other having a negative power, one of the two layers being a first layer and having three portions, a first portion with a first, refractive index, a second portion with a second, refractive index, and a third portion between the first and second portions extending transverse to a meridian of the lens with a gradient refractive index that varies continuously between the first and second refractive indices.

2. The lens of claim 1 wherein the rate of change of refractive index of the gradient refractive index follows the progression of a sine wave model from maximum to minimum extrema.

3. The lens of claim 2 wherein the layers comprise anterior and posterior surfaces of continuous curvature.

4. The lens of claim 1 wherein the lens is a progressive ophthalmic lens for use by a patient, and further wherein the first portion corresponds to a first zone of vision of the patient, the second portion corresponds to a second zone of vision of the patient, and the third portion corresponds to an intermediate and progressive zone of vision of the patient.

5. The lens of claim 4 wherein the first zone is a distance vision zone having a power for distance vision and the second zone is a near vision zone having a power for near vision and the third zone is an intermediate vision zone having a continuously variable power providing a range of vision between distance and near.

6. The lens of claim 4 the other of said two layers being a second layer and being shaped to provide, in combination with the first layer, a vision-correcting prescription.

7. The lens of claim 6 wherein the one layer having a positive power comprises the first layer having the three portions and the other layer having a negative power comprises the second layer having the vision-correcting prescription layer, further wherein the vision-correcting prescription layer has a generally constant refractive index.

8. The lens of claim 6 wherein the one layer having a negative power comprises the first layer having the three portions and the other layer having a positive power comprises the second layer having the vision-correcting prescription layer, further wherein the vision-correcting prescription layer has a generally constant refractive index.

9. The lens of claim 4 wherein the other of the two layers being a second layer and having three portions, a first portion with a first, refractive index, a second portion with a second, refractive index, and a third portion between the first and second portions extending transverse to said meridian with a gradient refractive index that varies continuously between the first and second refractive indices, and wherein the first and second layers are oriented with respect to each other in a positional relationship selected from the group consisting of a) having at least part of the portion of the first layer having a lower refractive index aligned along a line of sight of the patient with at least part of the portion of the second layer having a higher refractive index and b) having at least part of the portion of the first layer having a higher refractive index aligned along a line of sight of the patient with at least part of the portion of the second layer having a lower refractive index.

10. The lens of claim 9 including a third layer, the third layer being shaped to provide, in combination with the first and second layers, a vision-correcting prescription.

11. The lens of claim 10 wherein the vision-correcting prescription layer has a generally constant refractive index.

12. The lens of claim 4 wherein the first layer has an anterior surface and a posterior surface each generally transverse to a line of sight of the patient through the lens, the refractive index gradient having an extent between the anterior and posterior surfaces wherein through said extent is defined a surface that has a substantially constant index of refraction at least a portion of which is generally aligned with the line of sight of the patient through the lens.

13. The lens of claim 12 wherein the line of sight of the patient through the lens follows a downward gaze.

14. The lens of claim 13 wherein the downward gaze is at an angle of approximately 8° with respect to a straight-ahead gaze.

15. The lens of claim 9 wherein said at least two layers each have anterior and posterior surfaces each generally transverse to a line of sight of the patient through the lens, the gradient index having an extent between the anterior and posterior surfaces wherein through said extent is defined a surface that has a substantially constant index of refraction at least a portion of which is generally aligned with a line of sight of the patient through the lens.

16. The lens of claim 15 wherein the line of sight of the patient through the lens follows a downward gaze.

17. The lens of claim 16 wherein the downward gaze is at an angle of approximately 8° with respect to a straight-ahead gaze.

18. The lens of claim 1, wherein the two layers comprise Fresnel lenses and wherein the interface of the two layers comprises the Fresnel surfaces.

19. The lens of claim 18 wherein the lens is a progressive ophthalmic lens for use by a patient, and further wherein the first portion corresponds to a first zone of vision of the patient, the second portion corresponds to a second zone of vision of the patient, and the third portion corresponds to an intermediate and progressive zone of vision of the patient.

20. The lens of claim 19 the other of said two layers being a second layer having a surface for incorporating a vision-correcting prescription.

21. The lens of claim 19 the other of said two layers being a second layer having a substantially constant index of refraction which is substantially the same as the index of refraction of the one portion of the first layer.

22. The lens of claim 19 wherein the Fresnel surfaces have non-optically functional steps at least some of which are conical and wherein the apices of the cones defining the conical steps are located posterior of the posterior surface of the lens thereby providing increased light transmission from peripheral field points through the lens to the patient's eye.

23. The lens of claim 22 wherein the apices of the cones defining the conical steps are 16-28.5 mm behind the posterior surface of the lens.

24. The lens of claim 19 further including a layer comprising anterior and posterior surfaces of continuous curvature.

25. The lens of claim 19 wherein the Fresnel interface form has a radius of curvature ranging from infinite to 21 mm.

* * * * *